US012325454B2

(12) United States Patent
Hashimoto et al.

(10) Patent No.: US 12,325,454 B2
(45) Date of Patent: Jun. 10, 2025

(54) NOTIFICATION DEVICE AND NOTIFICATION METHOD

(71) Applicant: Mitsubishi Electric Corporation, Tokyo (JP)

(72) Inventors: Takayasu Hashimoto, Tokyo (JP); Shinsaku Fukutaka, Tokyo (JP); Akiko Imaishi, Tokyo (JP); Misato Yuasa, Tokyo (JP); Munetaka Nishihira, Tokyo (JP); Shinyoung Park, Tokyo (JP); Emiko Kido, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 272 days.

(21) Appl. No.: 18/077,261

(22) Filed: Dec. 8, 2022

(65) Prior Publication Data

US 2023/0101240 A1   Mar. 30, 2023

Related U.S. Application Data

(63) Continuation of application No. PCT/JP2020/029920, filed on Aug. 5, 2020.

(51) Int. Cl.
*B60W 50/14* (2020.01)
*B60W 60/00* (2020.01)

(52) U.S. Cl.
CPC ........ *B60W 60/0053* (2020.02); *B60W 50/14* (2013.01); *B60W 60/0057* (2020.02)

(58) Field of Classification Search
CPC ............. B60W 50/14; B60W 60/0053; B60W 60/0057
See application file for complete search history.

(56) References Cited

U.S. PATENT DOCUMENTS 10,528,044 B2    1/2020  Emura et al.
2015/0305247 A1* 10/2015 Chaney ............... A01F 15/148
                                              702/150

(Continued)

FOREIGN PATENT DOCUMENTS

JP    H10154112 A  *  6/1998
JP    2017-1563  A     1/2017

(Continued)

OTHER PUBLICATIONS

International Search Report and Written Opinion mailed on Nov. 2, 2020, received for PCT Application PCT/JP2020/029920, filed on Aug. 5, 2020, 10 pages including English Translation.

(Continued)

*Primary Examiner* — Vivek D Koppikar
*Assistant Examiner* — Farhad Dawodi
(74) *Attorney, Agent, or Firm* — XSENSUS LLP

(57) ABSTRACT

A notification device includes: an information acquisition unit that acquires driving operation information indicating a driving operation status by a driver of a vehicle; and a notification unit that notifies the driver of a driving operation requested to be executed by the driver during a period from notification of transfer of driving authority from the vehicle to the driver to transfer of the driving authority to the driver. The notification unit notifies the driver of a driving operation, execution of which has not been completed by the driver among the driving operations requested to be executed by the driver on the basis of the driving operation information.

8 Claims, 16 Drawing Sheets

(56) References Cited

U.S. PATENT DOCUMENTS

| | | | |
|---|---|---|---|
| 2016/0371895 A1* | 12/2016 | Jayanthi | H04W 4/023 |
| 2017/0364070 A1* | 12/2017 | Oba | G05D 1/81 |
| 2018/0113454 A1 | 4/2018 | Emura et al. | |
| 2018/0240287 A1* | 8/2018 | Watson | G07C 5/008 |
| 2019/0004514 A1 | 1/2019 | Hiwatashi et al. | |
| 2019/0039627 A1* | 2/2019 | Yamamoto | B60W 50/082 |
| 2019/0072957 A1 | 3/2019 | Fujimura et al. | |
| 2019/0204827 A1* | 7/2019 | Bhalla | G05D 1/0061 |
| 2020/0017118 A1* | 1/2020 | Miyahara | B60K 35/00 |

FOREIGN PATENT DOCUMENTS

| | | | | |
|---|---|---|---|---|
| JP | 2017-123054 A | | 7/2017 | |
| JP | 2017-207955 A | | 11/2017 | |
| JP | 2018-122647 A | | 8/2018 | |
| JP | 2019-10929 A | | 1/2019 | |
| JP | 6524501 B2 | | 6/2019 | |
| JP | 2019-209803 A | | 12/2019 | |
| KR | 20210058456 A | * | 5/2021 | |
| WO | WO-2018066023 A1 | * | 4/2018 | B60K 28/06 |

OTHER PUBLICATIONS

Notice of Reasons for Refusal mailed on Apr. 6, 2021, received for JP Application 2020-572573, 8 pages including English Translation.
Notice of Reasons for Refusal mailed on Nov. 9, 2021, received for JP Application 2020-572573, 11 pages including English Translation.
First Office Action mailed Nov. 26, 2024, in Chinese Application No. 202080104437.3, 17 pages including English Translation.

\* cited by examiner

FIG. 5
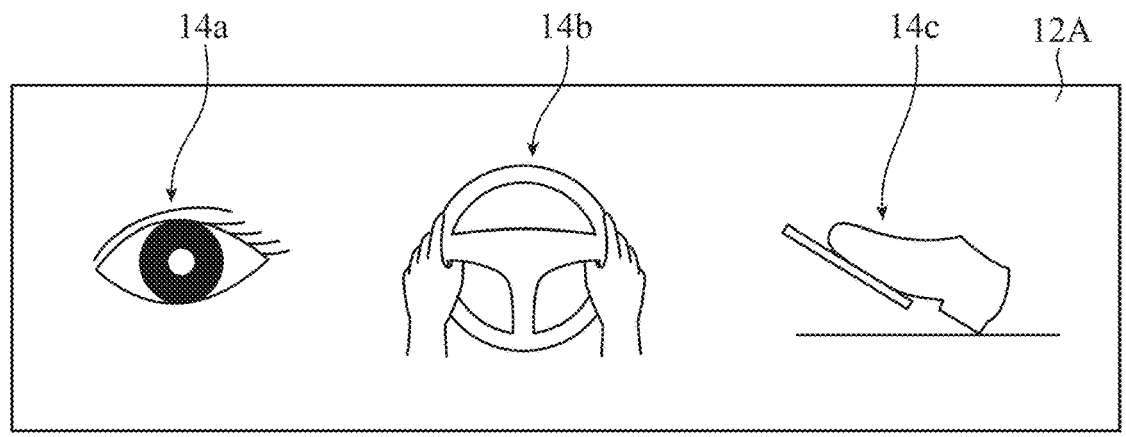
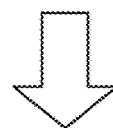
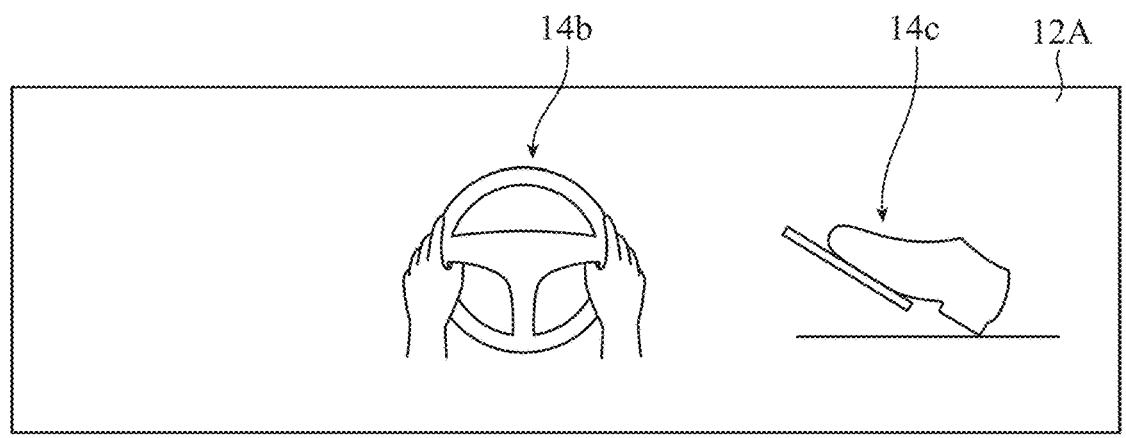
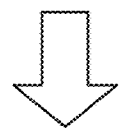
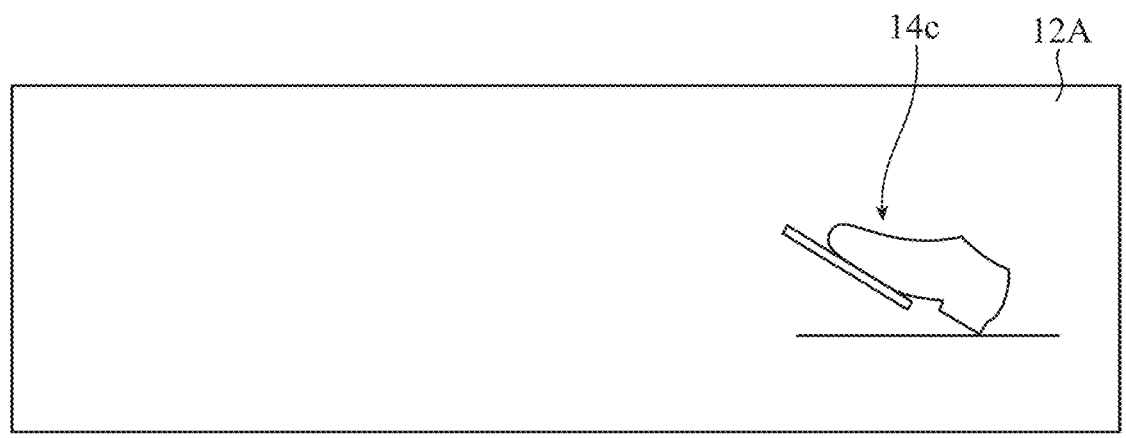

FIG. 6
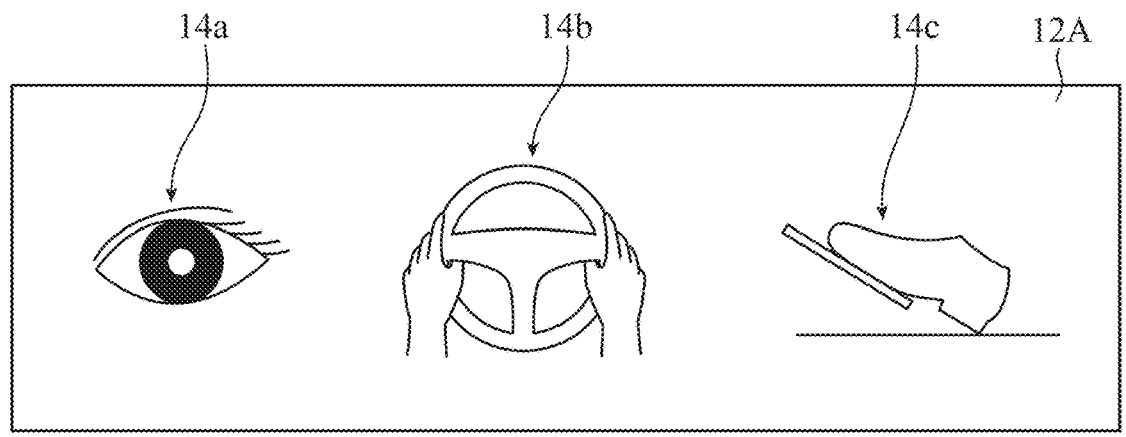
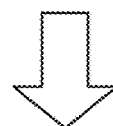
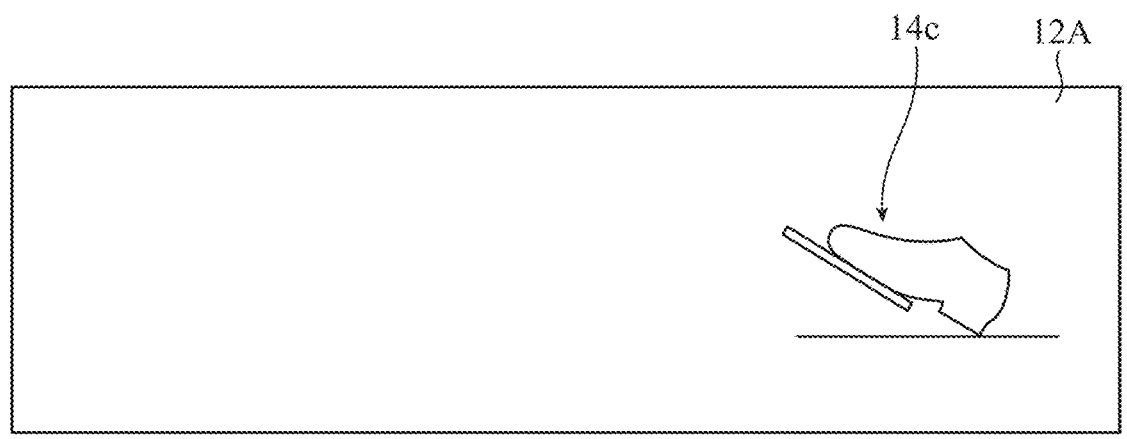
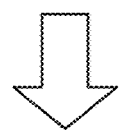
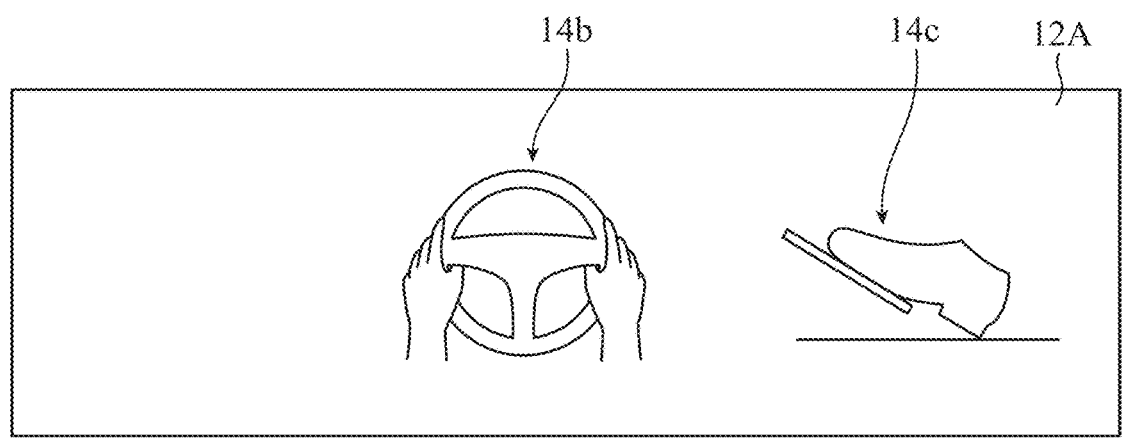

NOTIFICATION DEVICE AND NOTIFICATION METHOD

CROSS-REFERENCE TO RELATED APPLICATION

The present application is a continuation of International Patent Application No. PCT/JP2020/029920, filed Aug. 5, 2020, the entire contents of which are incorporated herein by reference.

TECHNICAL FIELD

The present disclosure relates to a notification device and a notification method for notifying a driver of a mobile object of an operation requested to be executed.

BACKGROUND ART

In a vehicle capable of automatic driving, driving authority may be transferred from the vehicle during automatic driving to a driver. For example, when a vehicle ends traveling in an automatic driving lane, driving authority of the vehicle is transferred from the vehicle to a driver. However, when the vehicle has been in automatic driving for a long time, there is a possibility that the driver's reaction speed is decreased and that the driver loses his/her driving operation sense.

Therefore, for example, there is a vehicle control device disclosed in Patent Literature 1 as a conventional technique aimed at allowing a driver to recover his/her driving operation sense that has been dulled during the automatic driving of a vehicle. This vehicle control device is mounted on a vehicle in which a driving operation unit used for a driving operation and a driving device that moves the vehicle are temporarily separated from each other during automatic driving. Therefore, the driving operation by the driver using the driving operation unit is a so-called dummy driving operation that is not reflected in movement of the vehicle even if the driving operation is executed.

The vehicle control device disclosed in Patent Literature 1 presents an operation request to a driver and receives an input of a signal based on an operation of the driver during a so-called preparation period for manual driving, which is a period from notification of transfer of driving authority from the vehicle to the driver to transfer of the driving authority to the driver, and switches the vehicle to manual driving in a case where a difference between a value obtained from the signal based on the operation of the driver and a reference value according to the operation request is within an allowable range.

CITATION LIST

Patent Literature

Patent Literature 1: JP 2017-1563 A

SUMMARY OF INVENTION

Technical Problem

Typically, even when a vehicle is during automatic driving, there is a possibility that driving authority is transferred from the vehicle to a driver himself/herself. Therefore, the driver does not necessarily execute only an operation irrelevant to a driving operation in the vehicle, and often executes a dummy driving operation. In addition, since there are various driving operations in a vehicle, in order for a driver to recover his/her driving operation sense, it is desirable to evenly execute a plurality of different driving operations in a preparatory period for manual driving, rather than execute an identical driving operation a plurality of times.

However, in the vehicle control device disclosed in Patent Literature 1, the driver is required to execute a driving operation regardless of whether the driving operation has been already executed by the driver before the preparatory period for manual driving. Therefore, there is a possibility that the vehicle control device requests the driver again to execute an identical driving operation which has been completed before the preparatory period for manual driving. In this case, there is a problem that the driver needs to execute again the identical driving operation which has been completed in the preparatory period for manual driving, and cannot execute another driving operation during the preparatory period.

The present disclosure has been made to solve the above problems, and an object of the present disclosure is to provide a notification device and a notification method capable of preventing a driver from being requested again to execute an operation which has been completed before transfer of driving authority is notified to the driver.

Solution to Problem

A notification device according to the present disclosure includes: processing circuitry configured to acquire operation information indicating an operation status by a driver of a mobile object from a time point going back to the past with reference to a time point when schedule information indicating that driving authority is scheduled to be transferred from the mobile object to the driver is acquired, to a latest time point; and notify the driver of an operation requested to be executed by the driver during a period from notification of the information indicating that the driving authority is transferred from the mobile object to the driver to transfer of the driving authority to the driver, notify the driver of an operation, execution of which has not been completed by the driver before the driver is notified of the information indicating that the driving authority is transferred from the mobile object to the driver, among operations requested to be executed by the driver before the driving authority is transferred to the driver on a basis of the operation information, not notify the driver of an operation, execution of which has been completed by the driver before the driver is notified of the information indicating that the driving authority is transferred from the mobile object to the driver, notify the driver of an operation that does not satisfy an execution completion condition among operations, execution of which has been completed by the driver before the driver is notified of the information indicating that the driving authority is transferred from the mobile object to the driver in a case where there is time to spare before the driving authority is transferred from the mobile object to the driver, request the mobile object to stop moving in a case where there is no time to spare before the driving authority is transferred from the mobile object to the driver, and add an execution completion time expected for different operations, execution of which has not been completed by the driver, to a time when the schedule information regarding the transfer of the driving authority to the driver is acquired, the transfer being determined by the mobile object moving by automatic driving, and change a time going back to the past from a driving transfer time when the driving authority is transferred from the mobile object to the driver by a time interval obtained by adding the execution completion time, to a notification time when the driver is notified of the information indicating that the driving authority is transferred from the mobile object to the driver and the operation requested to be executed by the driver.

Advantageous Effects of Invention

The notification device according to the present disclosure notifies a driver of an operation which has not been completed by the driver among operations requested to be executed by the driver during a period from notification of transfer of driving authority to the driver to transfer of the driving authority to the driver. As a result, the notification device according to the present disclosure can prevent the driver from being requested again to execute an operation which has been completed before the transfer of driving authority is notified to the driver.

BRIEF DESCRIPTION OF DRAWINGS

FIG. 5 is a diagram illustrating a transition example (1) of operation notification content in the first embodiment.

FIG. 6 is a diagram illustrating a transition example (2) of operation notification content in the first embodiment.

DESCRIPTION OF EMBODIMENTS

First Embodiment

Figure 1:
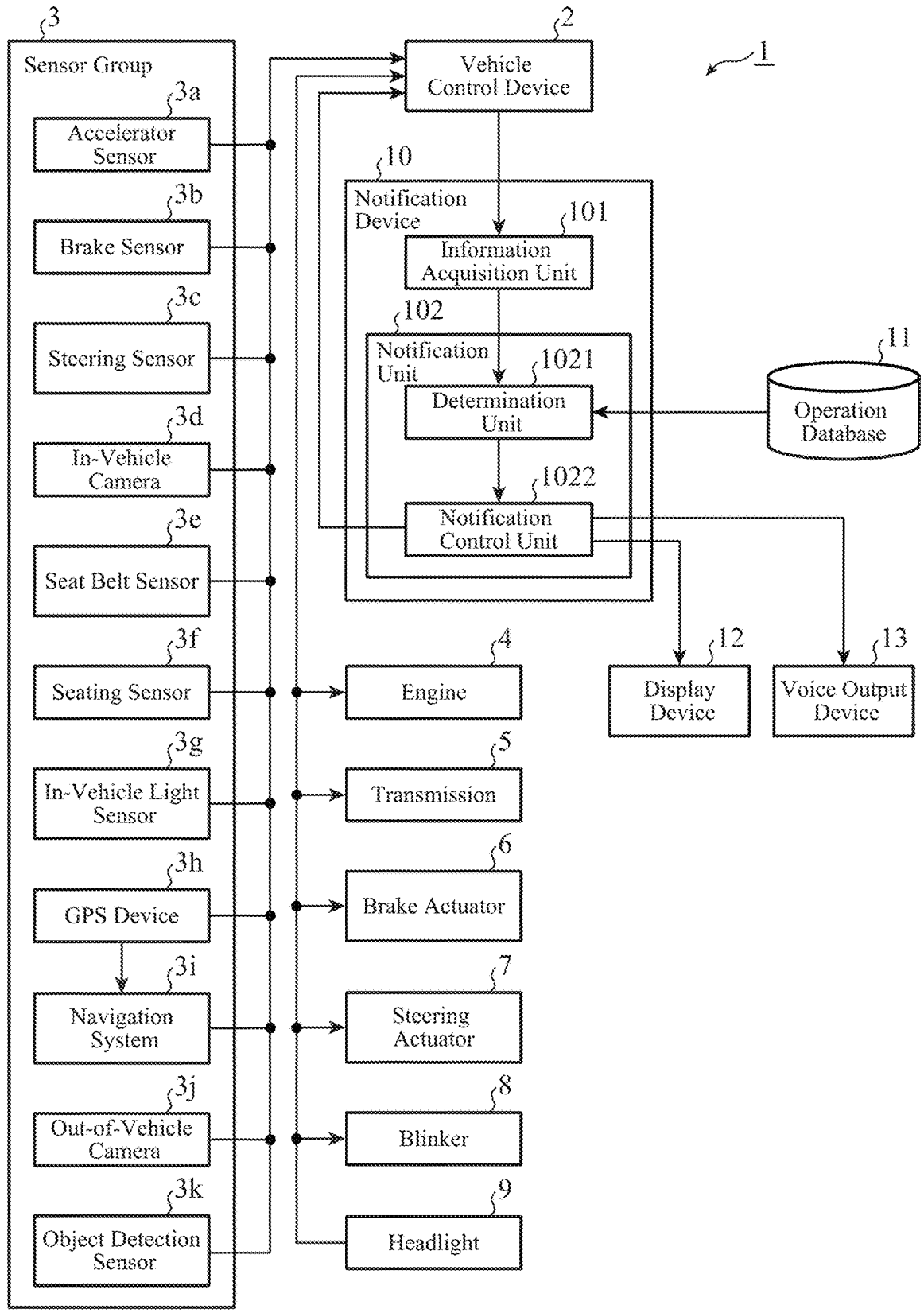
FIG. 1 is a block diagram illustrating a configuration of a vehicle control system including a notification device according to a first embodiment.

FIG. 1 is a block diagram illustrating a configuration of a vehicle control system 1 including a notification device 10. The vehicle control system 1 is a system that is mounted on a mobile object capable of manual driving by a driver and automatic driving not by the driver, for example, a vehicle such as an automobile, and controls an operation of the vehicle. In the vehicle control system 1, a vehicle control device 2 controls an engine 4, a transmission 5, a brake actuator 6, a steering actuator 7, a blinker 8, and a headlight 9 of a vehicle using sensor information detected by a sensor group 3, thereby performing various controls for implementing automatic driving of the vehicle. Examples of the various controls include lane keeping control, navigation control, and stop control. In addition, the vehicle control device 2 determines transfer of driving authority from the vehicle to the driver, and sets a scheduled point for switching to manual driving. The vehicle control device 2 outputs, to the notification device 10, schedule information indicating that the driving authority is transferred from the vehicle to the driver a certain time before the vehicle actually reaches the scheduled point.

The sensor group 3 illustrated in FIG. 1 includes, for example, an accelerator sensor 3a, a brake sensor 3b, a steering sensor 3c, an in-vehicle camera 3d, a seat belt sensor 3e, a seating sensor 3f, an in-vehicle light sensor 3g, a GPS device 3h, a navigation system 3i, an out-of-vehicle camera 3j, and an object detection sensor 3k. The accelerator sensor 3a is a sensor that detects contact with an accelerator pedal and a pedal operation amount. The accelerator sensor 3a outputs, to the vehicle control device 2, sensor information indicating that the driver places his/her foot on the accelerator pedal and the pedal operation amount which is an accelerator opening degree.

The brake sensor 3b is a sensor that detects contact with a brake pedal and a pedal operation amount. The brake sensor 3b outputs, to the vehicle control device 2, sensor information indicating that the driver places his/her foot on the brake pedal and the pedal operation amount. The steering sensor 3c is a sensor that detects contact with a steering and a steering operation amount. The steering sensor 3c outputs, to the vehicle control device 2, sensor information indicating that the driver has held the steering and the steering operation amount.

The in-vehicle camera 3d is a camera that is disposed in front of the inside of the vehicle and images a visual field range including a driver's seat side in the vehicle. The in-vehicle camera 3d images the upper body, including the face, of the driver seated in the driver's seat, and outputs imaging information to the vehicle control device 2. The seat belt sensor 3e is a sensor that detects fastening/unfastening of a seat belt of each seat of the vehicle. For example, the seat belt sensor 3e outputs, to the vehicle control device 2, sensor information indicating fastening/unfastening of a seat belt in a seat in which the seating sensor 3f has detected that an occupant is seated.

The seating sensor 3f is a sensor that is disposed in each seat of the vehicle and detects whether or not an occupant is seated. For example, a pressure detection sensor is used as the seating sensor 3f, and detects a pressing force applied to a seat when an occupant is seated. The seating sensor 3f outputs, to the vehicle control device 2, sensor information indicating seating and leaving of an occupant. The in-vehicle light sensor 3g is a sensor that is disposed in the vehicle and detects turning on and off of so-called in-vehicle lights, and outputs, to the vehicle control device 2, sensor information indicating turning on or off of the in-vehicle lights.

The GPS device 3h is a global positioning system, and detects the position of the vehicle using radio waves transmitted from a GPS satellite. The GPS device 3h outputs position information indicating the position of the vehicle to the vehicle control device 2 and the navigation system 3i.

The navigation system 3i is a system that calculates a recommended route for guiding the vehicle to a destination on the basis of the position information of the vehicle detected by the GPS device 3h and map information around the vehicle. The navigation system 3i may communicate with a server, receive external information such as congestion information and road closure information about the destination of the vehicle from the server, and calculate a recommended route reflecting the received external information. In addition, the navigation system 3i may be a system that transmits the position information and destination information of the vehicle to the server, receives a recommended route calculated by the server, and notifies the driver of the recommended route.

The out-of-vehicle camera 3j is a camera that images the outside of the vehicle. The out-of-vehicle camera 3j is disposed, for example, on the front, rear, left side, and right side of the vehicle, and outputs imaging information of ahead, backward, left side, and right side of the vehicle to the vehicle control device 2. The vehicle control device 2 can control the vehicle in consideration of presence of an object such as a person or a vehicle around the vehicle on the basis of the imaging information imaged by the out-of-vehicle camera 3j.

The object detection sensor 3k is a sensor that detects an object around the vehicle, and is, for example, an ultrasonic sensor, a radar sensor, a millimeter wave radar sensor, or an infrared laser sensor. The object detection sensor 3k calculates the position of an object present around the vehicle and a distance between the vehicle and the object, and outputs, to the vehicle control device 2, sensor information indicating the calculated position of the object and the calculated distance. In addition, the vehicle control device 2 may calculate the position of the object and the distance between the vehicle and the object on the basis of the sensor information of the object detected by the object detection sensor 3k.

The engine 4 generates power for driving the vehicle. For example, the engine 4 may be an internal combustion engine that generates power for rotating wheels using gasoline as fuel, or may be a motor that generates power for rotating wheels by electric power. The engine 4 can be operated on the basis of an instruction from the vehicle control device 2. The transmission 5 transmits power generated by the engine 4 to wheels of the vehicle. The transmission 5 can change a torque transmitted to a wheel by shifting gears on the basis of an instruction from the vehicle control device 2.

The brake actuator 6 is an actuator for operating a brake for decelerating the vehicle. For example, the brake actuator 6 can automatically operate the brake without relying on the driver on the basis of an instruction from the vehicle control device 2. The steering actuator 7 is an actuator that changes moving directions of the vehicle by controlling a steering operation. For example, the steering actuator 7 can change the moving directions of the vehicle by automatically operating the steering without relying on the driver on the basis of an instruction from the vehicle control device 2.

The blinker 8 is a direction indicator that indicates a traveling direction of the vehicle to the outside of the vehicle by emitting light. For example, the blinker 8 blinks on the basis of an instruction from the vehicle control device 2, and indicates a traveling direction of the vehicle to the outside. The headlight 9 is a lighting device that is disposed on a front side of the vehicle and emits light ahead of the vehicle. For example, the headlights 9 are arranged on the left side and the right side in front of the vehicle, and can switch between high beam that illuminates a far distance and low beam that illuminates a distance closer than the high beam by switching the structures of a light guiding portion that guides emitted light.

The notification device 10 notifies the driver of an operation requested to be executed during a period from notification of transfer of driving authority from the vehicle to the driver to transfer of the driving authority to the driver. For example, the notification device 10 notifies the driver of an operation, execution of which has not been completed by the driver among operations stored in an operation database 11 on the basis of the operation information acquired from the vehicle control device 2. The operation information is information indicating an operation status by the driver of the vehicle. Note that the operation information includes, for example, information indicating a state of an occupant in the vehicle and information indicating a state in the vehicle in addition to an operation status of a driving operation tool of the vehicle by the driver.

The operation database 11 is a database storing various operations requested to be executed by the driver for the purpose of recovering the blunted driving operation sense of the driver due to automatic driving of the vehicle. Examples of the operation requested to be executed by the driver include a steering operation, an accelerator operation, a brake operation, and a driving operation using a driving operation tool, such as turning on the blinker 8 or turning on/off the headlight 9. Examples of the operation requested to be executed by the driver also include an operation of designating a state of the driver, such as "gazing ahead of the vehicle", "holding the steering with both hands", "placing a foot on the accelerator pedal or the brake pedal", or "checking sides and backward of the vehicle". Examples of the operation requested to be executed by the driver also include an operation of designating a state of an occupant in the vehicle, such as "fastening of a seat belt by the occupant in the vehicle", and an operation of designating a state in the vehicle, such as "turning off lights in the vehicle".

The display device 12 is a device that visually notifies the driver of the vehicle of information, and is, for example, a head-up display (hereinafter, referred to as HUD) or a meter display. The HUD is a display that projects display information on a windshield of the vehicle or a combiner disposed in front of a driver's seat in the vehicle. The meter display is a display that is disposed in front of a driver's seat in the vehicle and displays meters of the vehicle. A voice output device 13 is a device that aurally notifies the driver of the vehicle of information, and is, for example, a speaker disposed in the vehicle.

As illustrated in FIG. 1, the notification device 10 includes an information acquisition unit 101 and a notification unit 102. The notification unit 102 includes a determination unit 1021 and a notification control unit 1022. The information acquisition unit 101 acquires operation information from the vehicle control device 2. The determination unit 1021 determines whether or not there is an operation, execution of which has not been completed by the driver among operations stored in the operation database 11 on the basis of the operation information of the driver acquired by the information acquisition unit 101. The notification control unit 1022 visually or aurally notifies the driver of an operation determined by the determination unit 1021 that the driver has not completed the execution of the operation.

Figure 2:
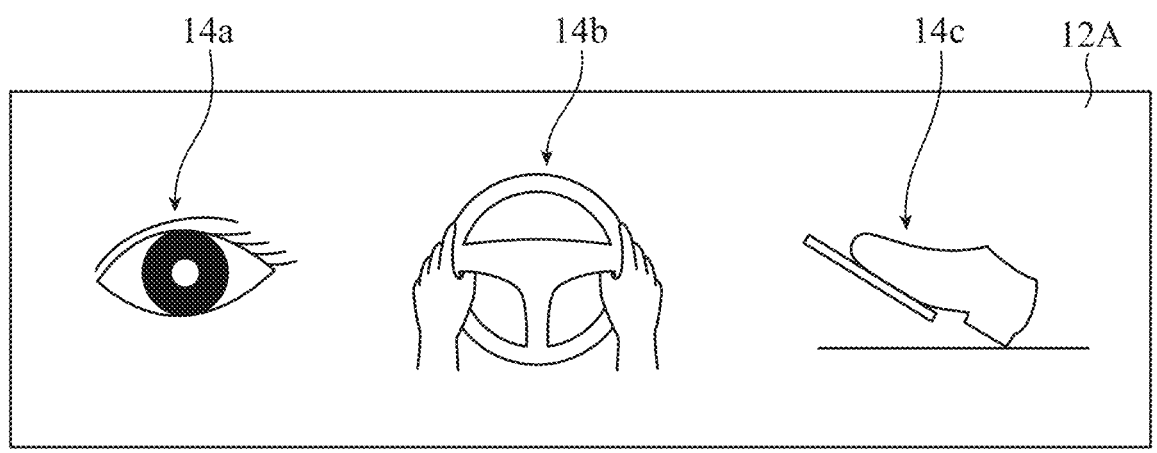
FIG. 2 is a diagram illustrating an example of a notification screen of an operation requested to be executed by a driver.

FIG. 2 is a diagram illustrating an example of a notification screen 12A of an operation requested to be executed by the driver, and illustrates the operation requested to be executed by the driver by image information. In FIG. 2, image information 14a indicates "gaze ahead of the vehicle". Image information 14b indicates "hold the steering with both hands". Image information 14c indicates that "place a foot on the accelerator pedal or the brake pedal". For example, when the schedule information is output from the vehicle control device 2 in the vehicle during automatic driving, the notification unit 102 outputs the image information 14a, 14b, and 14c to the display device 12 in a case where execution of operations such as "gaze ahead of the vehicle", "hold the steering with both hands", and "place a foot on the accelerator pedal or the brake pedal" has not been completed before the notification unit 102 notifies the driver of transfer of driving authority from the vehicle. As illustrated in FIG. 2, the display device 12 displays the notification screen 12A including the image information 14a, 14b, and 14c. Since the notification device 10 notifies the driver of only an operation, execution of which has not been completed, it is possible to prevent the driver from being requested again to execute the operation which has been completed.

In addition, in a case where execution of operations such as "gaze ahead of the vehicle", "hold the steering with both hands", and "place a foot on the accelerator pedal or the brake pedal" has not been completed before the notification unit 102 notifies of the driver of transfer of driving authority to the driver, the notification unit 102 outputs voice information indicating these operations to the voice output device 13. The voice output device 13 outputs a voice such as "please gaze ahead of the vehicle", "please hold the steering with both hands", or "please place your foot on the accelerator pedal or the brake pedal". Even if the notification device 10 aurally notifies the driver of an operation, execution of which has not been completed, it is possible to prevent the driver from being requested again to execute an operation which has been completed, similarly to the case of visually notifying the driver of an operation.

Details of a notification method according to the first embodiment are as follows.

Figure 3:
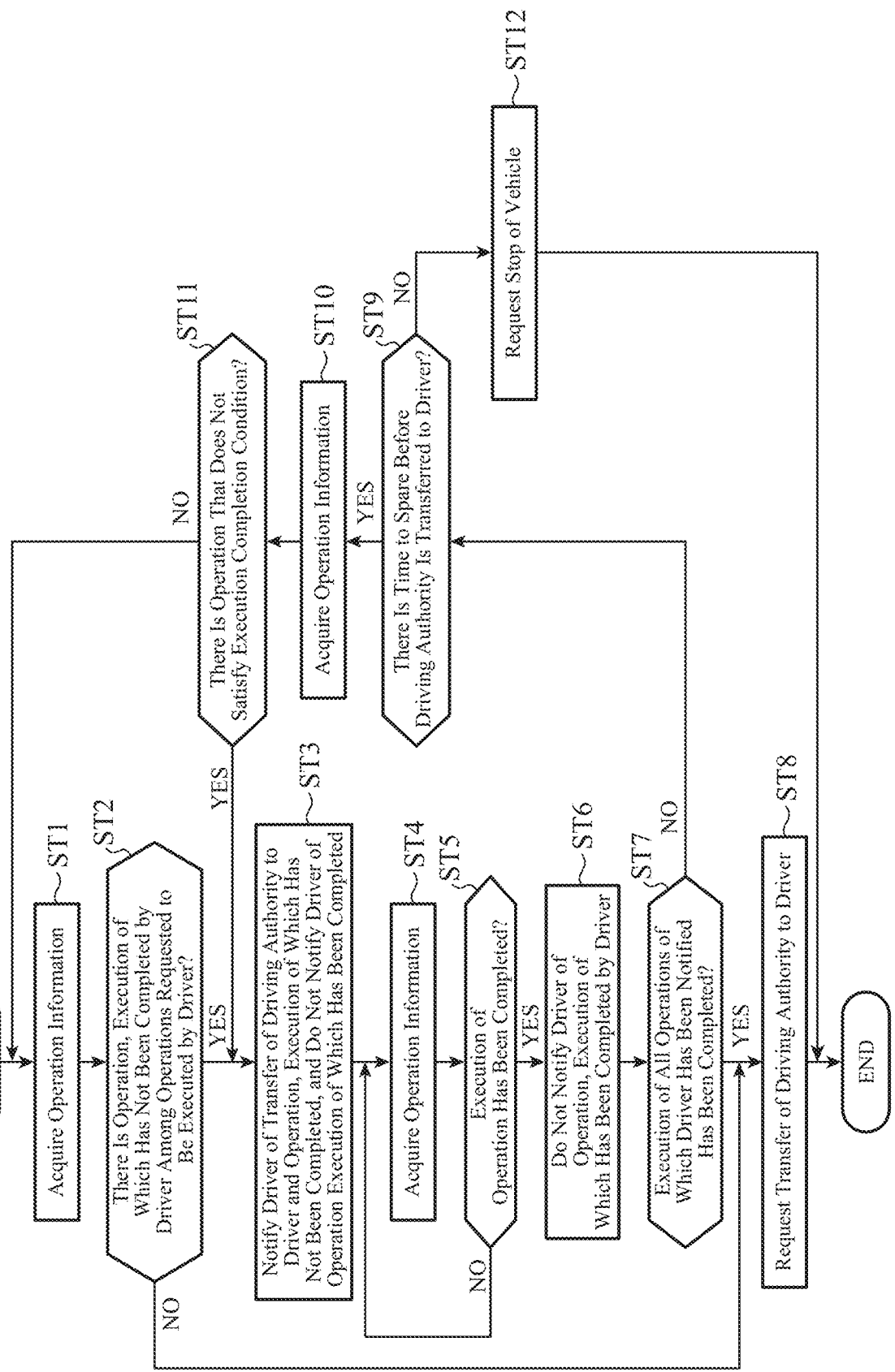
FIG. 3 is a flowchart illustrating a notification method according to the first embodiment.

FIG. 3 is a flowchart illustrating the notification method according to the first embodiment, and illustrates an operation of the notification device 10. The series of processes in FIG. 3 is started, for example, when the vehicle control device 2 determines transfer of driving authority from a vehicle to a driver in the vehicle during automatic driving and outputs, to the notification device 10, schedule information indicating that the driving authority is scheduled to be transferred from the vehicle to the driver. Note that, the vehicle control device 2 generates operation information indicating an operation status of the driver on the basis of sensor information sequentially detected by the sensor group 3 regardless of output of the schedule information, and holds time series data of the generated operation information.

The information acquisition unit 101 acquires operation information from the vehicle control device 2 (step ST1).

For example, the information acquisition unit 101 acquires time series data, from operation information at a time going back by a certain time in the past to the latest operation information, with reference to the time at which the schedule information output from the vehicle control device 2 is acquired. The operation information acquired by the information acquisition unit 101 is output to the notification unit 102.

Next, the determination unit 1021 determines whether or not there is an operation, execution of which has not been completed by the driver among operations stored in the operation database 11 on the basis of the operation information acquired by the information acquisition unit 101 (step ST2). For example, an execution completion condition is set for each operation stored in the operation database 11. When an operation status indicated by the operation information satisfies an execution completion condition of an operation corresponding to this operation information, the determination unit 1021 determines that the driver has completed execution of this operation, and when the operation status does not satisfy the execution completion condition, the determination unit 1021 determines that the driver has not completed execution of the operation.

If the determination unit 1021 determines that execution of all the operations requested to be executed by the driver has been completed (step ST2; NO), the notification control unit 1022 proceeds to a process in step ST8. When the determination unit 1021 determines that there is an operation, execution of which has not been completed by the driver among operations requested to be executed by the driver (step ST2; YES), the notification control unit 1022 notifies the driver of information indicating transfer of driving authority from the vehicle to the driver (hereinafter, referred to as driving authority transfer notification) and an operation, execution of which has not been completed by the driver, and does not notify the driver of an operation, execution of which has been completed by the driver (step ST3).

Figure 4A:
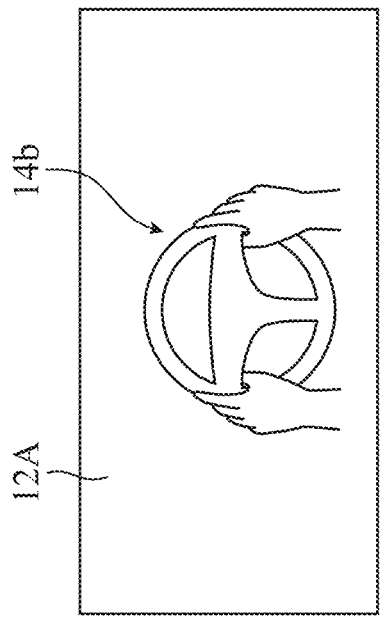
FIG. 4A is a screen view illustrating an example of a notification screen for requesting a driver to execute an operation of gazing ahead of a vehicle.
Figure 4B:
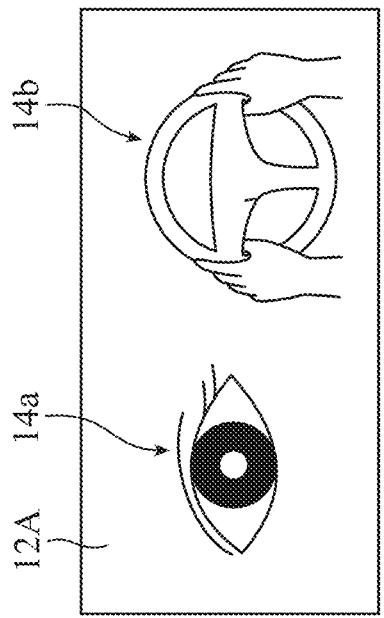
FIG. 4B is a screen view illustrating an example of a notification screen for requesting a driver to execute an operation of holding a steering with both hands.
Figure 4C:
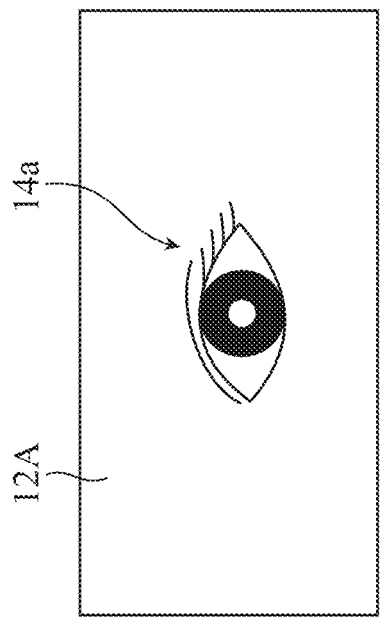
FIG. 4C is a screen view illustrating an example of a notification screen for requesting a driver to execute an operation of placing a foot on an accelerator pedal or a brake pedal.
Figure 4D:
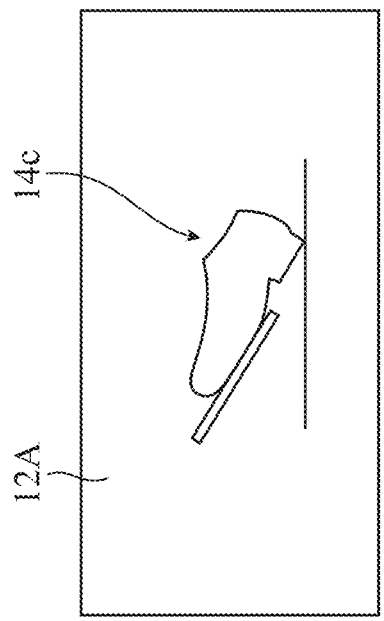
FIG. 4D is a screen view illustrating an example of a notification screen for requesting a driver to execute an operation of gazing ahead of a vehicle and to execute an operation of holding a steering with both hands.

FIG. 4A is a screen view illustrating an example of the notification screen 12A for requesting the driver to execute an operation of gazing ahead of the vehicle. FIG. 4B is a screen view illustrating an example of the notification screen 12A for requesting the driver to execute an operation of holding the steering with both hands. FIG. 4C is a screen view illustrating an example of the notification screen 12A for requesting the driver to execute an operation of putting his/her foot on the accelerator pedal or the brake pedal. FIG. 4D is a screen view illustrating an example of the notification screen 12A for requesting the driver to execute an operation of gazing ahead of the vehicle and an operation of holding the steering with both hands. In FIGS. 4A, 4B, 4C, and 4D, the operation requested to be executed by the driver includes the "operation of gazing ahead of the vehicle", the "operation of holding the steering with both hands", and the "operation of placing a foot on the accelerator pedal or the brake pedal".

For example, in a case where execution of the "operation of holding the steering with both hands" has been completed and execution of the "operation of placing a foot on the accelerator pedal or the brake pedal" has been completed among the operations requested to be executed by the driver, the notification control unit 1022 excludes these operations from the notification targets and determines the "operation of gazing ahead of the vehicle" as the notification target. The notification control unit 1022 outputs the image information 14*a* indicating the "operation of gazing ahead of the vehicle" to the display device 12. As illustrated in FIG. 4A, the display device 12 displays the notification screen 12A including the image information 14*a*.

For example, in a case where execution of the "operation of gazing ahead of the vehicle" has been completed and execution of the "operation of placing a foot on the accelerator pedal or the brake pedal" has been completed among the operations requested to be executed by the driver, the notification control unit 1022 excludes these operations from the notification targets and determines the "operation of holding the steering with both hands" as the notification target. The notification control unit 1022 outputs the image information 14*b* indicating the "operation of holding the steering with both hands" to the display device 12. As illustrated in FIG. 4B, the display device 12 displays the notification screen 12A including the image information 14*b*.

For example, in a case where execution of the "operation of gazing ahead of the vehicle" has been completed and execution of the "operation of holding the steering with both hands" has been completed among the operations requested to be executed by the driver, the notification control unit 1022 excludes these operations from the notification targets and determines the "operation of placing a foot on the accelerator pedal or the brake pedal" as the notification target. The notification control unit 1022 outputs the image information 14*c* indicating the "operation of placing a foot on the accelerator pedal or the brake pedal" to the display device 12. As illustrated in FIG. 4C, the display device 12 displays the notification screen 12A including the image information 14*c*.

For example, in a case where execution of the "operation of placing a foot on the accelerator pedal or the brake pedal" has been completed among the operations requested to be executed by the driver, the notification control unit 1022 excludes this operation from the notification targets and determines the "operation of gazing ahead of the vehicle" and the "operation of holding the steering with both hands" as the notification targets. The notification control unit 1022 outputs the image information 14*a* indicating the "operation of gazing ahead of the vehicle" and the image information 14*b* indicating the "operation of holding the steering with both hands" to the display device 12. As illustrated in FIG. 4D, the display device 12 displays the notification screen 12A including the image information 14*a* and the image information 14*b*. Note that, in a case where there is a plurality of operations, execution of which has not been completed by the driver among the operations requested to be executed by the driver, as illustrated in FIG. 4D, the driver may be notified of these operations simultaneously, or may be notified of these operations sequentially from any one of these operations.

The driver only needs to execute only the operation indicated by the image information displayed on the display device 12 together with the driving authority transfer notification. Therefore, the notification device 10 can prevent the driver from being requested again to execute an operation which has been completed before the driving authority transfer notification. The notification control unit 1022 may notify the driver of a simulation operation of the vehicle that is associated with execution of the operation which has been notified. For example, the notification control unit 1022 causes the display device 12 to display how the vehicle travels in a steering operation by the driver during manual driving. As a result, the driver can more reliably recover his/her driving operation sense.

While the notification control unit 1022 notifies the driver of an operation requested to be executed by the driver, the information acquisition unit 101 acquires, from the vehicle control device 2, operation information ranging from the past operation information to the latest operation information (step ST4). The determination unit 1021 determines whether or not the driver has completed execution of the operation, which has been notified, on the basis of the operation information acquired by the information acquisition unit 101 (step ST5). For example, when an operation status indicated by operation information corresponding to the operation of which the driver has been notified satisfies an execution completion condition of this operation, the determination unit 1021 determines that the driver has completed execution of this operation, and when the operation status does not satisfy the execution completion condition, the determination unit 1021 determines that the driver has not completed execution of the operation.

If it is determined that execution of the operation of which the driver has been notified has not been completed (step ST5; NO), the notification device 10 repeats the process from step ST4. If it is determined that execution of the operation of which the driver has been notified has been completed (step ST5; YES), the notification control unit 1022 does not notify the driver of the operation, execution of which has been completed by the driver among the operations of which the driver has been notified (step ST6).

FIG. 5 is a diagram illustrating a transition example (1) of operation notification content in the first embodiment. In FIG. 5, an operation requested to be executed by the driver includes three operations of the "operation of gazing ahead of the vehicle", the "operation of holding the steering with both hands", and the "operation of placing a foot on the accelerator pedal or the brake pedal".

In a case where the driver has not completed execution of any of the "operation of gazing ahead of the vehicle", the "operation of holding the steering with both hands", and the "operation of placing a foot on the accelerator pedal or the brake pedal", the notification control unit 1022 outputs the image information 14*a*, 14*b*, and 14*c* to the display device 12. As illustrated in the upper part of FIG. 5, the display device 12 displays the notification screen 12A including the image information 14*a*, 14*b*, and 14*c*.

Thereafter, when the driver completes execution of the "operation of gazing ahead of the vehicle", the notification control unit 1022 excludes the "operation of gazing ahead of the vehicle" from the notification targets and stops outputting the image information 14*a* to the display device 12. As a result, as illustrated in the middle part of FIG. 5, the display device 12 displays the notification screen 12A including only the image information 14*b* and 14*c*.

Furthermore, when the driver completes execution of the "operation of holding the steering with both hands", the notification control unit 1022 excludes the "operation of holding the steering with both hands" from the notification targets and stops outputting the image information 14*b* to the display device 12. As a result, as illustrated in the lower part of FIG. 5, the display device 12 displays the notification screen 12A including only the image information 14*c*. Since the operation is not notified in order of completion of execution, the driver can recover the driving operation sense while recognizing that the operation requested from the notification device 10 has been executed.

When determining that execution of an operation has been completed by the driver, the determination unit 1021 determines whether or not execution of all the operations of which the driver has been notified has been completed (step ST7). In step ST2, if it is determined that there is no operation, execution of which has not been completed by the driver among the operations requested to be executed by the driver (step ST2; NO), or execution of all the operations of which the driver has been notified has been completed (step ST7; YES), it is determined that the driver has completed preparation for manual driving, and therefore the notification control unit 1022 requests the vehicle control device 2 to transfer driving authority to the driver (step ST8). The vehicle control device 2 transfers the driving authority to the driver in response to the request from the notification device 10. Since the driver has completed preparation for manual driving, the driver can smoothly drive the vehicle.

If the determination unit 1021 determines that there is an operation, execution of which has not been completed among the operations of which the driver has been notified (step ST7; NO), the determination unit 1021 determines whether or not there is time to spare before a scheduled time at which the driving authority is transferred to the driver (step ST9). If the determination unit 1021 determines that there is time to spare before the driving authority is transferred to the driver (step ST9; YES), the information acquisition unit 101 acquires, from the vehicle control device 2, operation information ranging from the past operation information to the latest operation information (step ST10).

The determination unit 1021 determines whether or not there is an operation that no longer satisfies the execution completion condition among the operations of which the driver has been notified in step ST3 on the basis of the operation information acquired by the information acquisition unit 101 (step ST11). That is, the determination unit 1021 determines presence or absence of an operation that no longer satisfies the execution completion condition before execution of all the operations of which the driver has been notified in step ST3 is completed among the operations, execution of which has been completed by the driver. If there is no operation that does not satisfy the execution completion condition (step ST11; NO), the notification device 10 returns to the process in step ST1 and repeats the series of processes illustrated in FIG. 3.

If the determination unit 1021 determines that there is an operation that does not satisfy the execution completion condition before execution of all the operations of which the driver has been notified is completed (step ST11; YES), the notification control unit 1022 proceeds to a process in step ST3. As a result, the notification control unit 1022 notifies again the driver of the operation that does not satisfy the execution completion condition.

FIG. 6 is a diagram illustrating a transition example (2) of operation notification content in the first embodiment. In FIG. 6, an operation requested to be executed by the driver includes three operations of the "operation of gazing ahead of the vehicle", the "operation of holding the steering with both hands", and the "operation of placing a foot on the accelerator pedal or the brake pedal". In a case where the driver has not completed execution of any of the "operation of gazing ahead of the vehicle", the "operation of holding the steering with both hands", and the "operation of placing a foot on the accelerator pedal or the brake pedal", the notification control unit 1022 outputs the image information 14*a*, 14*b*, and 14*c* to the display device 12. As illustrated in the upper part of FIG. 6, the display device 12 displays the notification screen 12A including the image information 14*a*, 14*b*, and 14*c*.

Thereafter, when the driver completes execution of the "operation of gazing ahead of the vehicle" and the "operation of holding the steering with both hands", the notification control unit 1022 excludes the "operation of gazing ahead of the vehicle" and the "operation of holding the steering with both hands" from the notification targets and stops outputting the image information 14*a* and the image information 14*b* to the display device 12. As a result, as illustrated in the middle part of FIG. 6, the display device 12 displays the notification screen 12A including only the image information 14*c*.

In a case where the execution completion condition of the "operation of gazing ahead of the vehicle" is not satisfied before the driver completes execution of the "operation of placing a foot on the accelerator pedal or the brake pedal", for example, when the driver turns his/her eyes to any direction other than ahead of the vehicle, the notification control unit 1022 outputs the image information 14*a* to the display device 12 again with the "operation of gazing ahead of the vehicle" as a notification target. As a result, as illustrated in the lower part of FIG. 6, the display device 12 displays the image information 14*c* and the image information 14*a* again on the notification screen 12A. Since the driver is notified again of the operation that does not satisfy the execution completion condition, the driver can reliably execute the operation requested from the notification device 10.

When there is an operation, execution of which has not been completed by the driver among the operations of which the driver has been notified, the driver can determine that preparation for manual driving has not been completed. Therefore, if the determination unit 1021 determines that there is no time to spare before a scheduled time at which the driving authority is transferred to the driver (step ST9; NO), the notification control unit 1022 requests the vehicle control device 2 to stop the vehicle in such a manner that the driving authority is not transferred to the driver who has not completed preparation for manual driving (step ST12).

When stop of the vehicle is requested from the notification device 10, the vehicle control device 2 searches for a place where the vehicle can safely stop on the basis of, for example, position information of the vehicle detected by the GPS device 3*h* and map information around the vehicle. Examples of the place where the vehicle can safely stop include a parking lot of a commercial facility or the like, a gas station, or a public parking lot, but may be a road shoulder in the event of an emergency. When the place where the vehicle can safely stop is searched for, the vehicle control device 2 automatically stops the vehicle at the place of the search result.

A hardware configuration for implementing a function of the notification device 10 is as follows.

Functions of the information acquisition unit 101 and the notification unit 102 included in the notification device 10 are implemented by a processing circuit. That is, the notification device 10 includes a processing circuit that executes processes in step ST1 to step ST12 illustrated in FIG. 3. The processing circuit may be dedicated hardware or a central processing unit (CPU) for executing a program stored in a memory.

Figure 7:
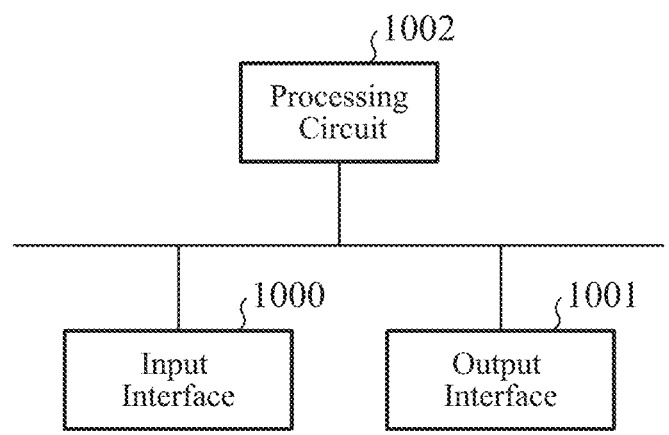
FIG. 7 is a block diagram illustrating a hardware configuration for implementing a function of the notification device according to the first embodiment.
Figure 8:
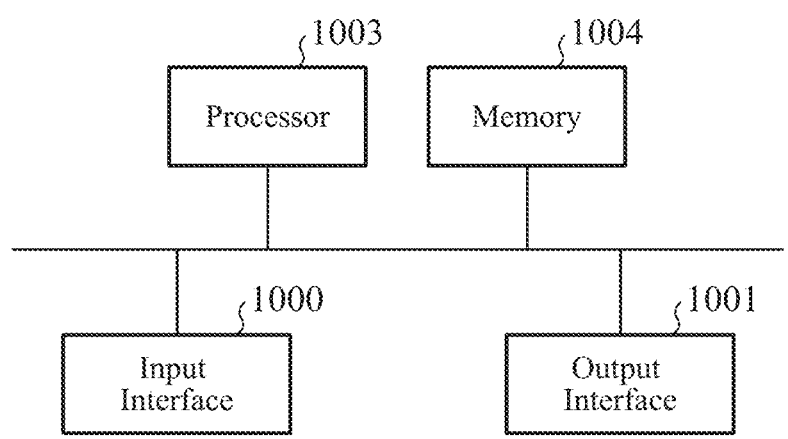
FIG. 8 is a block diagram illustrating a hardware configuration in which software for implementing the function of the notification device according to the first embodiment is executed.

FIG. 7 is a block diagram illustrating a hardware configuration for implementing a function of the notification device 10. FIG. 8 is a block diagram illustrating a hardware configuration in which software for implementing the function of the notification device 10 is executed. In FIGS. 7 and 8, an input interface 1000 is, for example, an interface that relays sensor information output from the vehicle control device 2 to the notification device 10 or information indicating an operation output from the operation database 11 to the notification device 10. An output interface 1001 is an interface that relays information that is output from the notification device 10 to the display device 12 or the voice output device 13 and indicates an operation requested to be executed by the driver.

In a case where the processing circuit is a processing circuit 1002 of dedicated hardware illustrated in FIG. 7, for example, a single circuit, a composite circuit, a programmed processor, a parallel programmed processor, an application specific integrated circuit (ASIC), a field-programmable gate array (FPGA), or a combination thereof corresponds to the processing circuit 1002. Functions of the information acquisition unit 101 and the notification unit 102 included in the notification device 10 may be implemented by separate processing circuits, or these functions may be collectively implemented by one processing circuit.

In a case where the processing circuit is a processor 1003 illustrated in FIG. 8, the functions of the information acquisition unit 101 and the notification unit 102 included in the notification device 10 are implemented by software, firmware, or a combination of software and firmware. Note that software or firmware is described as a program and stored in a memory 1004.

The processor 1003 reads and executes the program stored in the memory 1004, and thereby implements the functions of the information acquisition unit 101 and the notification unit 102 included in the notification device 10. For example, the notification device 10 includes the memory 1004 for storing a program that causes processes in steps ST1 to ST12 in the flowchart illustrated in FIG. 3 to be executed as a result when the program is executed by the processor 1003. These programs cause a computer to execute procedures or methods performed by the information acquisition unit 101 and the notification unit 102. The memory 1004 may be a computer-readable storage medium storing a program for causing a computer to function as the information acquisition unit 101 and the notification unit 102.

To the memory 1004, for example, a nonvolatile or volatile semiconductor memory such as a random access memory (RAM), a read only memory (ROM), a flash memory, an erasable programmable read only memory (EPROM), or an electrically-EPROM (EEPROM), a magnetic disk, a flexible disk, an optical disc, a compact disc, a mini disc, a DVD, or the like corresponds.

Some of the functions of the information acquisition unit 101 and the notification unit 102 included in the notification device 10 may be implemented by dedicated hardware, and some of the functions may be implemented by software or firmware. For example, the function of the information acquisition unit 101 is implemented by the processing circuit 1002 that is dedicated hardware, and the function of the notification unit 102 is implemented by the processor 1003 reading and executing a program stored in the memory 1004. In this way, the processing circuit can implement the above functions by hardware, software, firmware, or a combination thereof.

As described above, the notification device 10 according to the first embodiment notifies the driver of an operation, execution of which has not been completed by the driver among operations requested to be executed by the driver during a period from notification of transfer of the driving authority to the driver to transfer of the driving authority to the driver. As a result, since the driver only needs to execute only the operation of which the driver has been notified by the notification device 10, the notification device 10 can prevent the driver from being requested again to execute an operation has been completed before the driver is notified of transfer of the driving authority to the driver.

Second Embodiment

Figure 9:
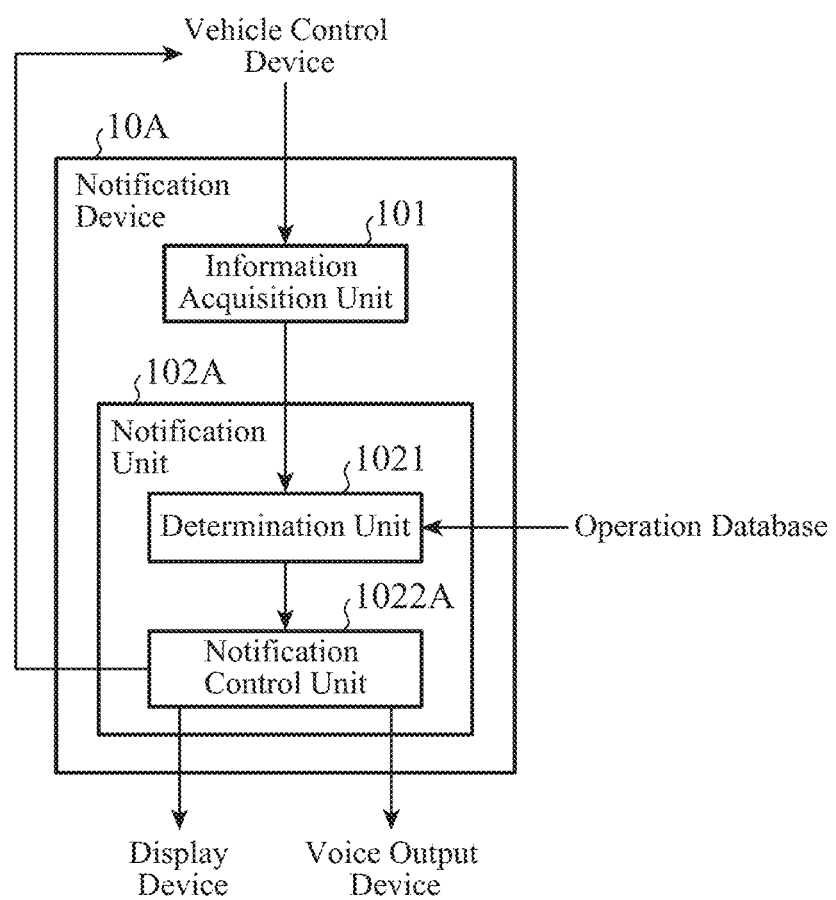
FIG. 9 is a block diagram illustrating a configuration of a notification device according to a second embodiment.

FIG. 9 is a block diagram illustrating a configuration of a notification device 10A according to a second embodiment. The notification device 10A separately notifies a driver of an operation, execution of which has not been completed by the driver and an operation, execution of which has been completed by the driver among operations stored in an operation database 11 on the basis of operation information acquired from a vehicle control device 2. As illustrated in FIG. 9, the notification device 10A includes an information acquisition unit 101 and a notification unit 102A. The notification unit 102A includes a determination unit 1021 and a notification control unit 1022A. In FIG. 9, the same components as those in FIG. 1 are denoted by the same reference numerals, and description thereof is omitted.

The notification control unit 1022A separately notifies the driver of an operation, execution of which has not been completed by the driver and an operation, execution of which has been completed by the driver. For example, the notification control unit 1022A displays, on a notification screen 12A of a display device 12, image information indicating completion of execution in such a manner that the image information indicating completion of execution is superimposed on image information indicating an operation, execution of which has been completed by the driver. The image information indicating completion of execution includes, for example, a check mark. In addition, the notification control unit 1022A may set at least one of a display size and a display color of the image information indicating the operation, execution of which has been completed by the driver to be different from an operation, execution of which has not been completed by the driver.

The notification control unit 1022A may output, to a voice output device 13, voice information indicating the operation, execution of which has been completed by the driver in addition to the operation, execution of which has not been completed by the driver. For example, the voice output device 13 outputs a voice such as "the operation of placing a foot on the accelerator pedal or the brake pedal has been completed, but the operation of gazing ahead of the vehicle and the operation of holding the steering with both hands have not been completed". Even if the driver is aurally notified of the operations, the driver can recognize the operation, execution of which has been completed and the operation, execution of which has not been completed.

Details of a notification method according to the second embodiment are as follows.

Figure 10:
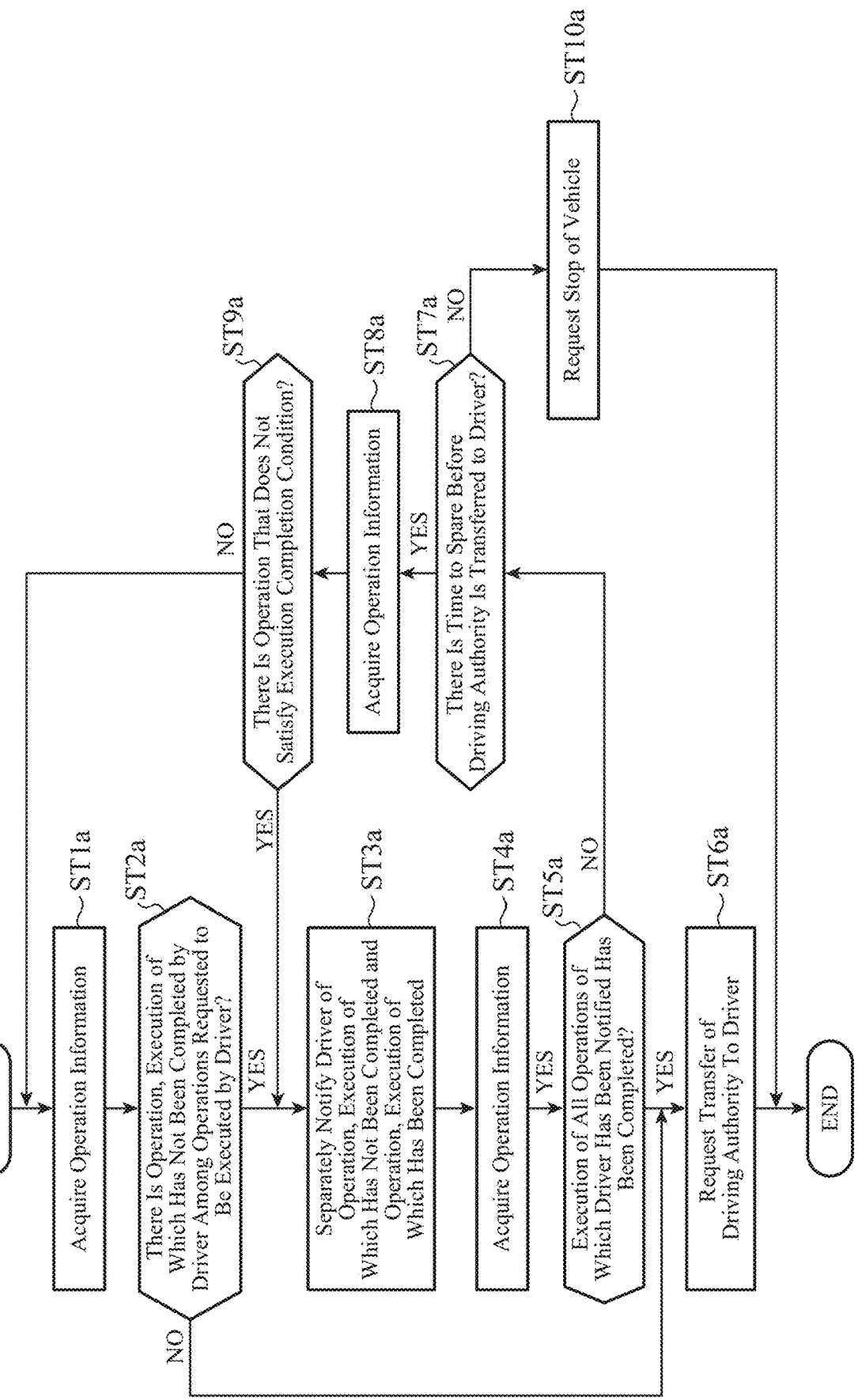
FIG. 10 is a flowchart illustrating a notification method according to the second embodiment.

FIG. 10 is a flowchart illustrating the notification method according to the second embodiment, and illustrates an operation of the notification device 10A. The series of processes in FIG. 10 is started, for example, when the vehicle control device 2 determines transfer of driving authority from a vehicle to a driver in the vehicle during automatic driving and outputs, to the notification device 10A, schedule information indicating that the driving authority is scheduled to be transferred from the vehicle to the driver. Note that, the vehicle control device 2 generates operation information indicating an operation status of the driver on the basis of sensor information sequentially detected by the sensor group 3 regardless of output of the schedule information, and holds time series data of the generated operation information.

The information acquisition unit 101 acquires operation information from the vehicle control device 2 (step ST1a). For example, the information acquisition unit 101 acquires time series data, from operation information at a time going back by a certain time in the past to the latest operation information, with reference to the time at which the schedule information output from the vehicle control device 2 is acquired. The operation information acquired by the information acquisition unit 101 is output to the notification unit 102A.

Next, the determination unit 1021 determines whether or not there is an operation, execution of which has not been completed by the driver among operations stored in the operation database 11 on the basis of the operation information acquired by the information acquisition unit 101 (step ST2a). For example, an execution completion condition is set for each operation stored in the operation database 11. When an operation status indicated by the operation information satisfies an execution completion condition of an operation corresponding to this operation information, the determination unit 1021 determines that the driver has completed execution of this operation, and when the operation status does not satisfy the execution completion condition, the determination unit 1021 determines that the driver has not completed execution of the operation.

If the determination unit 1021 determines that execution of all the operations requested to be executed by the driver has been completed (step ST2a; NO), the notification control unit 1022A proceeds to a process in step ST6a. When the determination unit 1021 determines that there is an operation, execution of which has not completed by the driver among operations requested to be executed by the driver (step ST2a; YES), the notification control unit 1022A notifies the driver of information indicating transfer of driving authority from the vehicle to the driver (hereinafter, referred to as driving authority transfer notification) and separately notifies the driver of an operation, execution of which has not been completed by the driver and an operation, execution of which has been completed by the driver (step ST3a).

Figure 11:
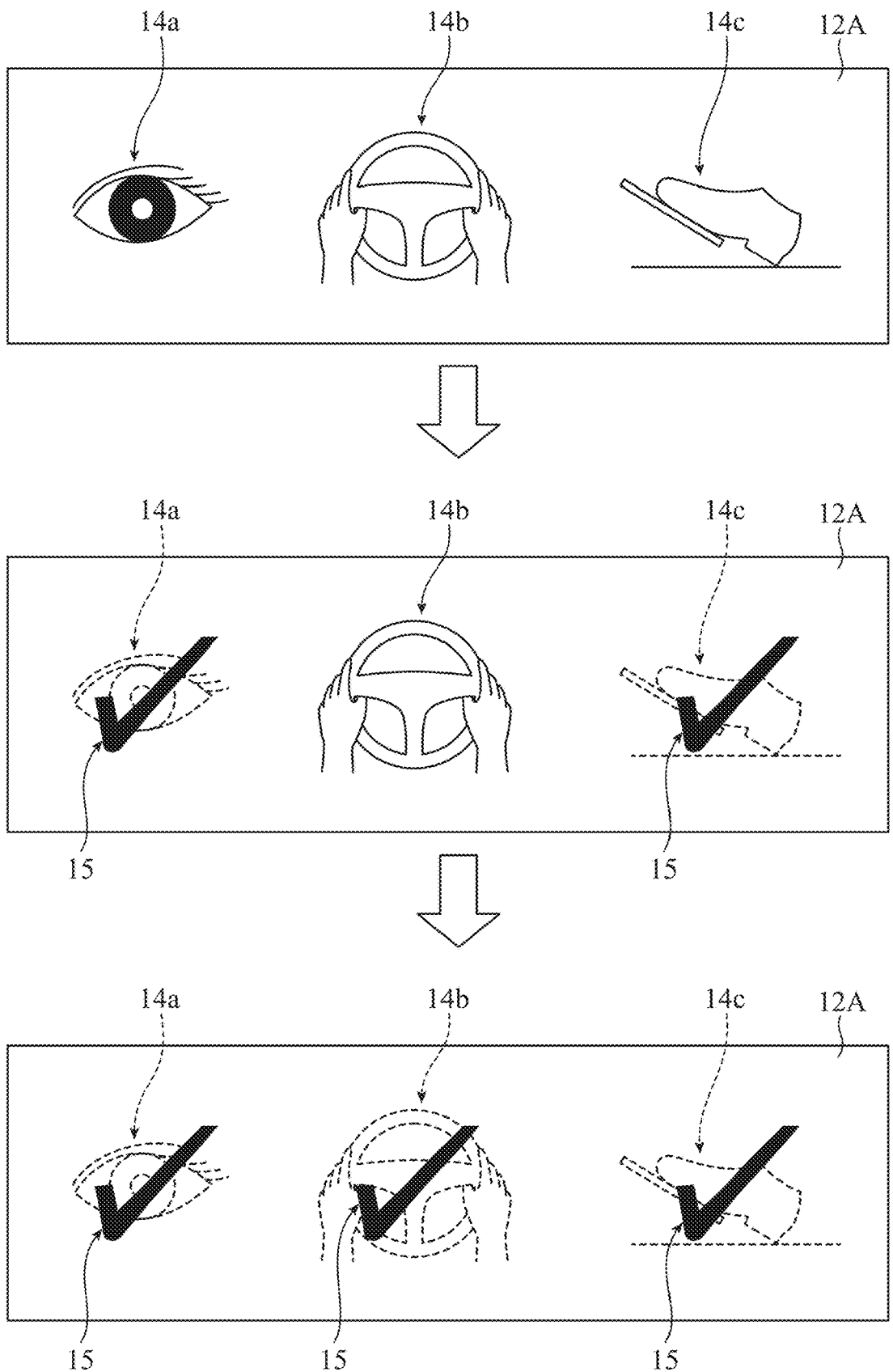
FIG. 11 is a diagram illustrating a transition example of operation notification content in the second embodiment.

FIG. 11 is a diagram illustrating a transition example of operation notification content in the second embodiment. In FIG. 11, an operation requested to be executed by the driver includes three operations of the "operation of gazing ahead of the vehicle", the "operation of holding the steering with both hands", and the "operation of placing a foot on the accelerator pedal or the brake pedal". In a case where the driver has not completed execution of any of the "operation of gazing ahead of the vehicle", the "operation of holding the steering with both hands", and the "operation of placing a foot on the accelerator pedal or the brake pedal", the notification control unit 1022A outputs the image information 14a, 14b, and 14c to the display device 12. As illustrated in the upper part of FIG. 11, the display device 12 displays the notification screen 12A including the image information 14a, 14b, and 14c.

Thereafter, when the driver completes execution of the "operation of gazing ahead of the vehicle" and the "operation of placing a foot on the accelerator pedal or the brake pedal", the notification control unit 1022A outputs, to the display device 12, a check mark image 14 to be displayed in such a manner that the check mark image 14 is superimposed on each of the image information 14a indicating the "operation of gazing ahead of the vehicle" and the image information 14b indicating the "operation of placing a foot on the accelerator pedal or the brake pedal". As a result, as illustrated in the middle part of FIG. 11, the display device 12 displays the notification screen 12A in which the check mark image 14 is superimposed on each of the image information 14a and the image information 14c.

Furthermore, when the driver completes execution of the "operation of holding the steering with both hands", the notification control unit 1022 outputs, to the display device 12, the check mark image 14 to be displayed in such a manner that the check mark image 14 is superimposed on the "operation of holding the steering with both hands". As a result, as illustrated in the lower part of FIG. 11, the display device 12 displays the notification screen 12A in which the check mark image 14 is superimposed on each of the image information 14a, 14b, and 14c. Since the check mark is placed in order of completion of execution, the driver can recover his/her driving operation sense while recognizing that the operation requested from the notification device 10A has been executed.

While the notification control unit 1022A notifies the driver of an operation requested to be executed by the driver, the information acquisition unit 101 acquires, from the vehicle control device 2, operation information ranging from the past operation information to the latest operation information (step ST4a). The determination unit 1021 determines whether or not execution of all the operations of which the driver has been notified has been completed on the basis of the operation information acquired by the information acquisition unit 101 (step ST5a). Since the subsequent processes in step ST6a to step ST10a are the same as the processes in step ST8 to step ST12 illustrated in FIG. 3, description thereof is omitted.

Note that functions of the information acquisition unit 101 and the notification unit 102A included in the notification device 10A are implemented by a processing circuit. That is, the notification device 10A includes a processing circuit for executing processes in step ST1a to step ST10a illustrated in FIG. 10. The processing circuit may be the dedicated hardware processing circuit 1002 illustrated in FIG. 7, or may be the processor 1003 for executing a program stored in the memory 1004 illustrated in FIG. 8.

As described above, in the notification device 10A according to the second embodiment, the notification unit 102A separately notifies the driver of an operation, execution of which has not been completed by the driver and an operation, execution of which has been completed by the driver. As a result, since the driver only needs to execute an operation which has not been completed among the operations of which the driver has been notified by the notification device 10A, the notification device 10A can prevent the driver from being requested again to execute an operation which has been completed before the driver is notified of transfer of the driving authority to the driver.

Third Embodiment

Figure 12:
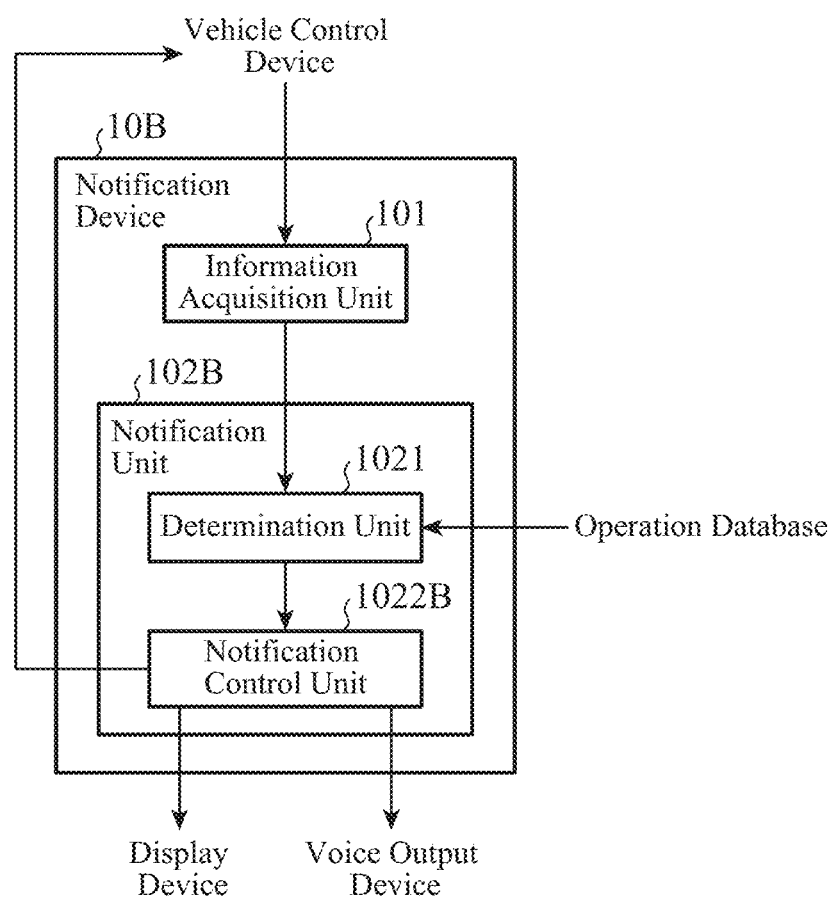
FIG. 12 is a block diagram illustrating a configuration of a notification device according to a third embodiment.

FIG. 12 is a block diagram illustrating a configuration of a notification device 10B according to a third embodiment. The notification device 10B changes a notification timing of transferring driving authority from a vehicle to a driver and a notification timing of an operation requested to be executed by the driver in accordance with the number of operations, execution of which has not been completed by the driver. As illustrated in FIG. 12, the notification device 10B includes an information acquisition unit 101 and a notification unit 102B. The notification unit 102B includes a determination unit 1021 and a notification control unit 1022B. In FIG. 12, the same components as those in FIG. 1 are denoted by the same reference numerals, and description thereof is omitted.

The notification control unit 1022B changes a notification timing of transferring driving authority from the vehicle to the driver and a notification timing of an operation requested to be executed by the driver in accordance with the number of operations, execution of which has not been completed by the driver. For example, the notification control unit 1022B causes a display device 12 or a voice output device 13 to notify the driver of driving authority transfer and the operation, execution of which has not been completed by the driver at a time corresponding to the number of operations, execution of which has not been completed by the driver among operations stored in an operation database 11.

Details of a notification method according to the third embodiment are as follows.

Figure 13:
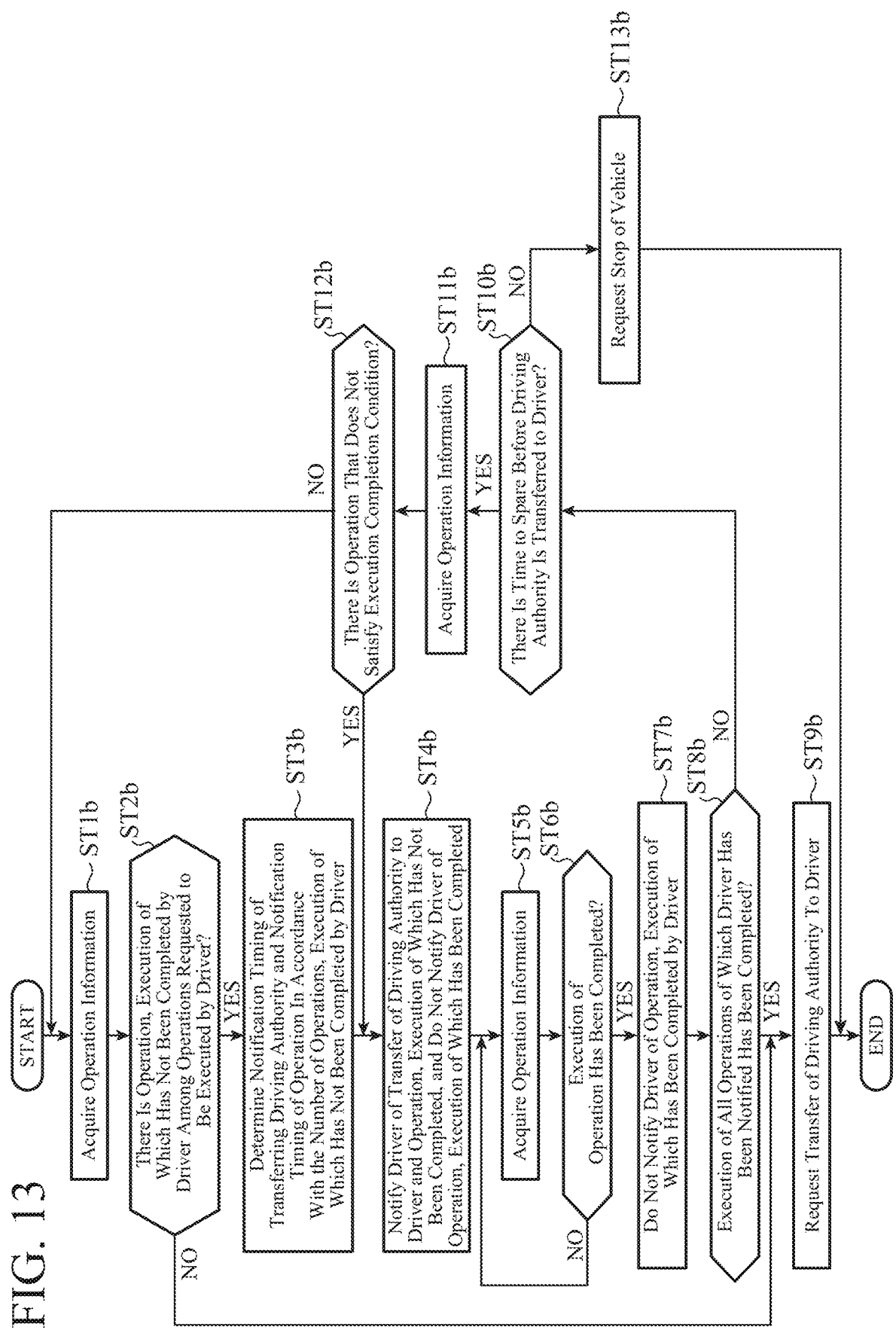
FIG. 13 is a flowchart illustrating a notification method according to the third embodiment.

FIG. 13 is a flowchart illustrating the notification method according to the third embodiment, and illustrates an operation of the notification device 10B. The series of processes in FIG. 13 is started, for example, when the vehicle control device 2 determines transfer of driving authority from a vehicle to a driver in the vehicle during automatic driving and outputs, to the notification device 10B, schedule information indicating that the driving authority is scheduled to be transferred from the vehicle to the driver. Note that, the vehicle control device 2 generates operation information indicating an operation status of the driver on the basis of sensor information sequentially detected by the sensor group 3 regardless of output of the schedule information, and holds time series data of the generated operation information.

The information acquisition unit 101 acquires operation information from the vehicle control device 2 (step ST1b). For example, the information acquisition unit 101 acquires time series data, from operation information at a time going back by a certain time in the past to the latest operation information, with reference to the time at which the schedule information output from the vehicle control device 2 is acquired. The operation information acquired by the information acquisition unit 101 is output to the notification unit 102B.

Next, the determination unit 1021 determines whether or not there is an operation, execution of which has not been completed by the driver among operations stored in the operation database 11 on the basis of the operation information acquired by the information acquisition unit 101 (step ST2b). For example, an execution completion condition is set for each operation stored in the operation database 11. When an operation status indicated by the operation information satisfies an execution completion condition of an operation corresponding to this operation information, the determination unit 1021 determines that the driver has completed execution of this operation, and when the operation status does not satisfy the execution completion condition, the determination unit 1021 determines that the driver has not completed execution of the operation.

If the determination unit 1021 determines that execution of all the operations requested to be executed by the driver has been completed (step ST2b; NO), the notification control unit 1022B proceeds to a process in step ST9b. When the determination unit 1021 determines that there is an operation, execution of which has not been completed by the driver among operations requested to be executed by the driver (step ST2b; YES), the notification control unit 1022B changes a timing of driving authority transfer notification and a notification timing of an operation requested to be executed by the driver in accordance with the number of operations, execution of which has not been completed by the driver (step ST3b).

Figure 14:
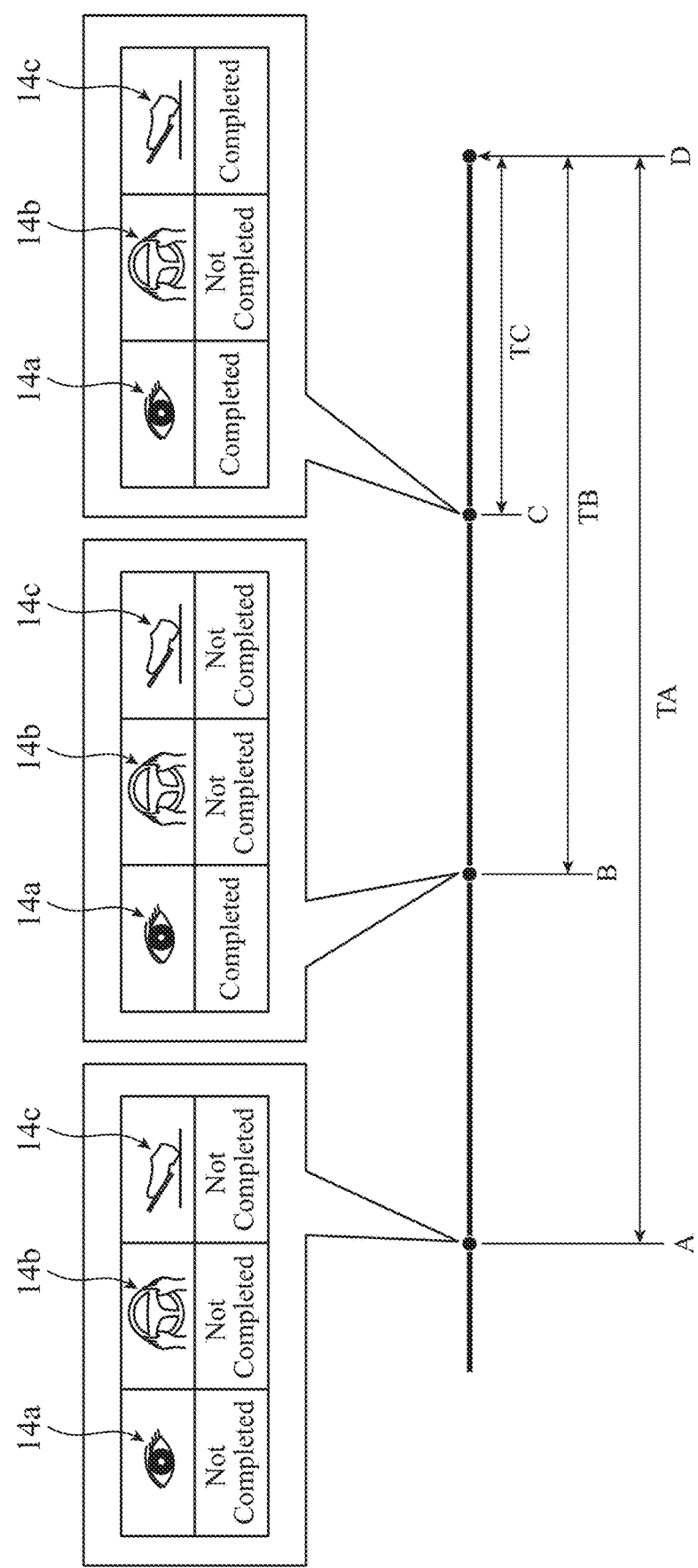
FIG. 14 is a time change diagram illustrating an outline of a process of determining a timing to notify a driver of transfer of driving authority to the driver in the third embodiment.

FIG. 14 is a time change diagram illustrating an outline of a process of determining a timing to notify the driver of transfer of driving authority to the driver in the third embodiment. In FIG. 14, an operation requested to be executed by the driver includes three operations of the "operation of gazing ahead of the vehicle", the "operation of holding the steering with both hands", and the "operation of placing a foot on the accelerator pedal or the brake pedal".

When the information acquisition unit 101 acquires, from the vehicle control device 2, the schedule information indicating transfer of the driving authority from the vehicle to the driver, in a case where execution of any of the "operation of gazing ahead of the vehicle", the "operation of holding the steering with both hands", and the "operation of placing a foot on the accelerator pedal or the brake pedal" has not been completed as indicated by "not completed" in FIG. 14, it is determined that the number of operations to be executed by the driver is large.

In a case where execution of any of the "operation of gazing ahead of the vehicle", the "operation of holding the steering with both hands", and the "operation of placing a foot on the accelerator pedal or the brake pedal" has not been completed, the notification control unit 1022B determines time A, at which a time interval TA from time D at which the driving authority is transferred from the vehicle to the driver is longest, as a time at which the driver is notified of the driving authority transfer and the above operations.

In addition, when the information acquisition unit 101 acquires the schedule information from the vehicle control device 2, in a case where execution of the "operation of gazing ahead of the vehicle" has been completed as indicated by "completed" in FIG. 14, but execution of the "operation of holding the steering with both hands" and the "operation of placing a foot on the accelerator pedal or the brake pedal" has not been completed, the notification control unit 1022B determines time B, at which a time interval from time D at which the driving authority is transferred from the vehicle to the driver is TB, as a time at which the driver is notified of the driving authority transfer and the above operations. The time interval TB is a period of time shorter than the time interval TA.

Furthermore, when the information acquisition unit 101 acquires the schedule information from the vehicle control device 2, in a case where execution of the "operation of gazing ahead of the vehicle" and the "operation of placing a foot on the accelerator pedal or the brake pedal" has been completed as indicated by "completed" in FIG. 14, but execution of the "operation of holding the steering with both hands" has not been completed, the notification control unit 1022B determines time C, at which a time interval from time D at which the driving authority is transferred from the vehicle to the driver is TC, as a time at which the driver is notified of the driving authority transfer and the above operation. The time interval TC is a period of time shorter than each of the time interval TA and the time interval TB. As a result, the driver can execute the operation of which the driver has been notified with sufficient time.

In FIG. 13, since the processes in step ST4b to step ST13b are the same as the processes in step ST3 to step ST12 illustrated in FIG. 3, description thereof is omitted.

Note that functions of the information acquisition unit 101 and the notification unit 102B included in the notification device 10B are implemented by a processing circuit. That is, the notification device 10A includes a processing circuit for executing processes in step ST1c to step ST13c illustrated in FIG. 16. The processing circuit may be the dedicated hardware processing circuit 1002 illustrated in FIG. 7, or may be the processor 1003 for executing a program stored in the memory 1004 illustrated in FIG. 8.

As described above, in the notification device 10B according to the third embodiment, the notification unit 102B changes a notification timing of transferring driving authority from the vehicle to the driver and a notification timing of an operation requested to be executed by the driver in accordance with the number of operations, execution of which has not been completed by the driver. For example, in a case where the number of operations, execution of which has not been completed by the driver, exceeds a threshold, the notification timing is advanced. As a result, since the driver can execute the operation of which the driver has been notified with sufficient time, the notification device 10B can cause the driver to reliably execute the operation of which the driver has been notified.

Fourth Embodiment

Figure 15:
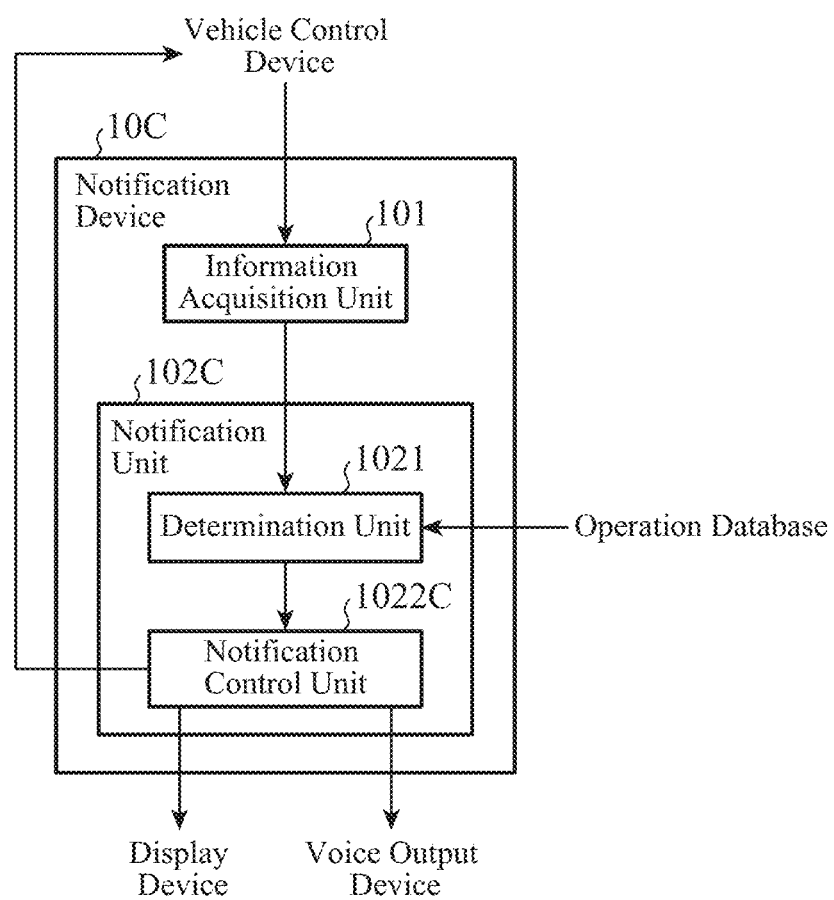
FIG. 15 is a block diagram illustrating a configuration of a notification device according to a fourth embodiment.

FIG. 15 is a block diagram illustrating a configuration of a notification device 10C according to a fourth embodiment. The notification device 10C changes a notification timing of transferring driving authority from a vehicle to a driver and a notification timing of an operation requested to be executed by the driver, in accordance with the content of an operation, execution of which has not been completed by the driver. As illustrated in FIG. 15, the notification device 10C includes an information acquisition unit 101 and a notification unit 102C. The notification unit 102C includes a determination unit 1021 and a notification control unit 1022C. In FIG. 15, the same components as those in FIG. 1 are denoted by the same reference numerals, and description thereof is omitted.

The notification control unit 1022C changes a notification timing of transferring driving authority from a vehicle to a driver and a notification timing of an operation requested to be executed by the driver, in accordance with the content of an operation, execution of which has not been completed by the driver. For example, for each operation stored in an operation database 11, an execution completion time during which the driver is expected to complete execution is set according to the content of the operation. The notification control unit 1022C causes a display device 12 or a voice output device 13 to notify the driver of driving authority transfer and an operation, execution of which has not been completed by the driver at a time corresponding to a total execution completion time of operations requested to be executed by the driver.

Details of a notification method according to the fourth embodiment are as follows.

Figure 16:
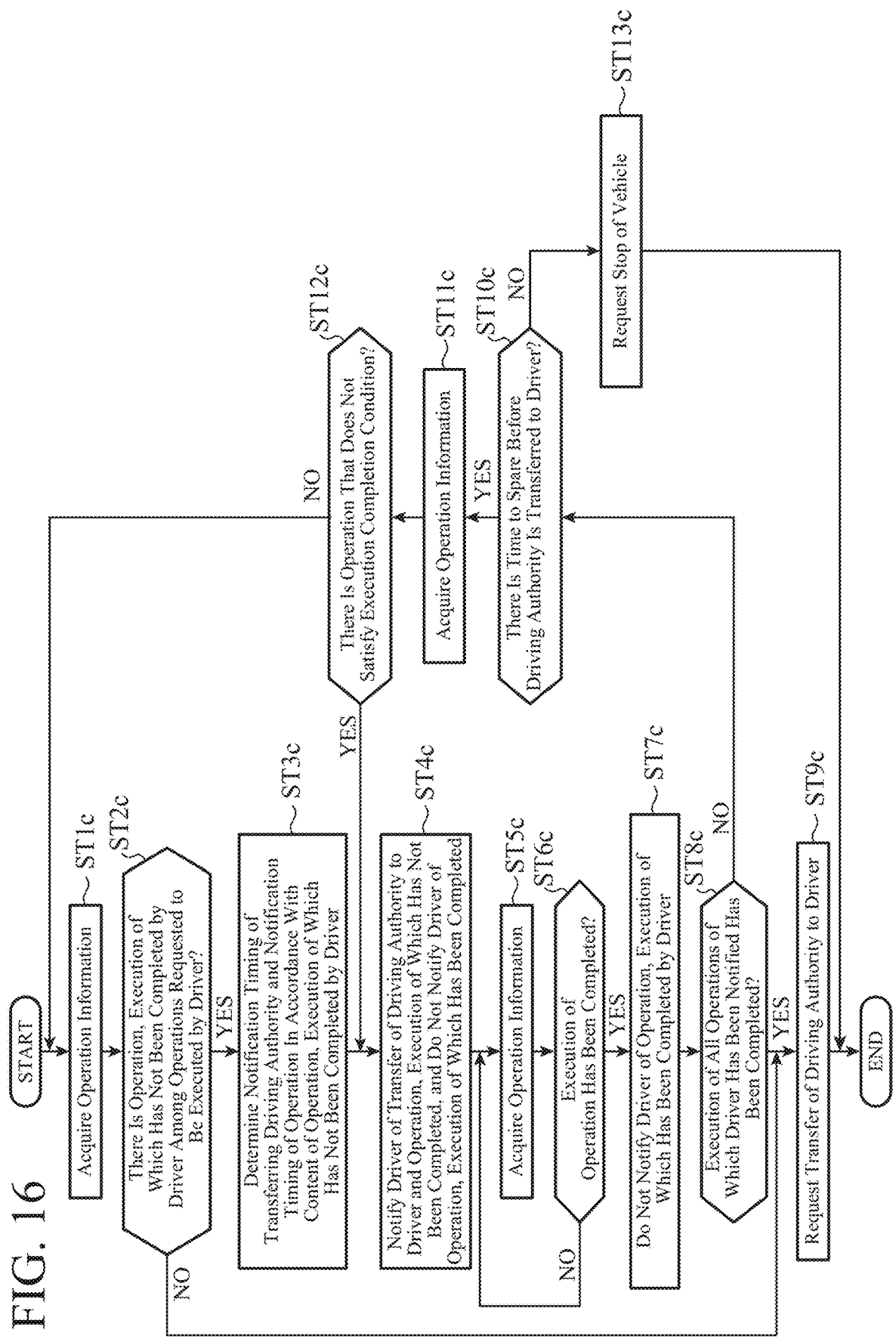
FIG. 16 is a flowchart illustrating a notification method according to the fourth embodiment.

FIG. 16 is a flowchart illustrating the notification method according to the fourth embodiment, and illustrates an operation of the notification device 10C. The series of processes in FIG. 16 is started, for example, when the vehicle control device 2 determines transfer of driving authority from a vehicle to a driver in the vehicle during automatic driving and outputs, to the notification device 10C, schedule information indicating that the driving authority is scheduled to be transferred from the vehicle to the driver. Note that, the vehicle control device 2 generates operation information indicating an operation status of the driver on the basis of sensor information sequentially detected by the sensor group 3 regardless of output of the schedule information, and holds time series data of the generated operation information.

The information acquisition unit 101 acquires operation information from the vehicle control device 2 (step ST1c). For example, the information acquisition unit 101 acquires time series data, from operation information at a time going back by a certain time in the past to the latest operation information, with reference to the time at which the schedule information output from the vehicle control device 2 is acquired. The operation information acquired by the information acquisition unit 101 is output to the notification unit 102C.

Next, the determination unit 1021 determines whether or not there is an operation, execution of which has not been completed by the driver among operations stored in the operation database 11 on the basis of the operation information acquired by the information acquisition unit 101 (step ST2c). For example, an execution completion condition is set for each operation stored in the operation database 11. When an operation status indicated by the operation information satisfies an execution completion condition of an operation corresponding to this operation information, the determination unit 1021 determines that the driver has completed execution of this operation, and when the operation status does not satisfy the execution completion condition, the determination unit 1021 determines that the driver has not completed execution of the operation.

If the determination unit 1021 determines that execution of all the operations requested to be executed by the driver has been completed (step ST2c; NO), the notification control unit 1022C proceeds to a process in step ST9c. When the determination unit 1021 determines that there is an operation, execution of which has not completed by the driver among operations requested to be executed by the driver (step ST2c; YES), the notification control unit 1022C changes a timing of driving authority transfer notification and a notification timing of an operation requested to be executed by the driver, in accordance with the content of an operation, execution of which has not been completed by the driver (step ST3c).

Figure 17:
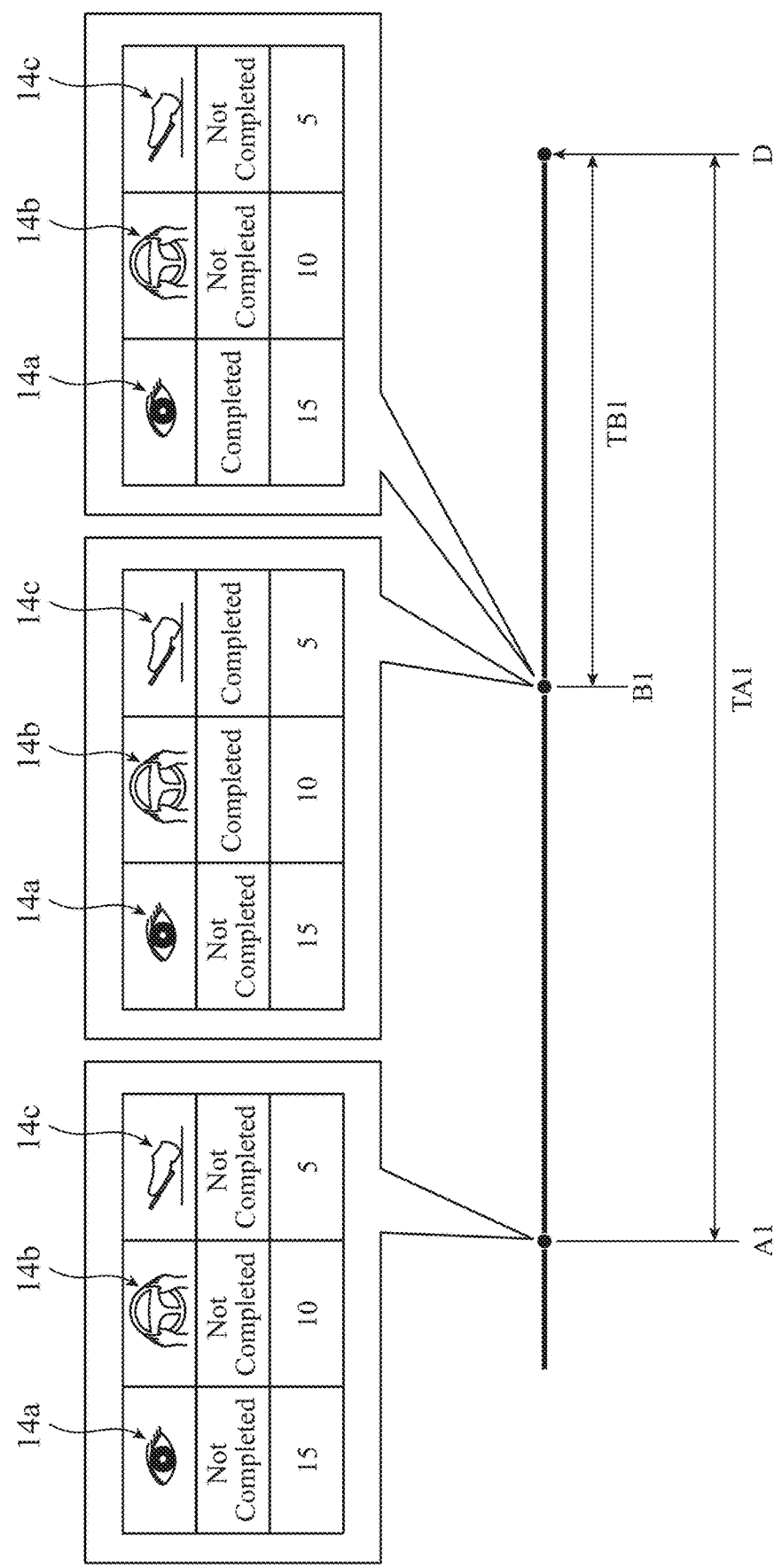
FIG. 17 is a time change diagram illustrating an outline of a process of determining a timing to notify a driver of transfer of driving authority to the driver in the fourth embodiment.

FIG. 17 is a time change diagram illustrating an outline of a process of determining a timing to notify the driver of transfer of driving authority to the driver in the fourth embodiment. In FIG. 14, an operation requested to be executed by the driver includes three operations of the "operation of gazing ahead of the vehicle", the "operation of holding the steering with both hands", and the "operation of placing a foot on the accelerator pedal or the brake pedal".

When the information acquisition unit 101 acquires, from the vehicle control device 2, the schedule information indicating transfer of the driving authority from the vehicle to the driver, in a case where execution of any of the "operation of gazing ahead of the vehicle", the "operation of holding the steering with both hands", and the "operation of placing a foot on the accelerator pedal or the brake pedal" has not been completed as indicated by "not completed" in FIG. 17, the notification control unit 1022C adds an execution completion time corresponding to the content of an operation, execution of which has not been completed. For example, the execution completion time of the "operation of gazing ahead of the vehicle" is fifteen seconds, the execution completion time of the "operation of holding the steering with both hands" is ten seconds, and the execution completion time of the "operation of placing a foot on the accelerator pedal or the brake pedal" is five seconds.

Since it is assumed that it is required to complete execution on the basis of a value (for example, thirty seconds)

obtained by adding the execution completion time of each of the "operation of gazing ahead of the vehicle", the "operation of holding the steering with both hands", and the "operation of placing a foot on the accelerator pedal or the brake pedal", the notification control unit 1022B determines time A1, at which a time interval TA1 from time D at which the driving authority is transferred from the vehicle to the driver is longest, as a time at which the driver is notified of the driving authority transfer and the above operations.

In addition, when the information acquisition unit 101 acquires the schedule information from the vehicle control device 2, in a case where execution of the "operation of holding the steering with both hands" and the "operation of placing a foot on the accelerator pedal or the brake pedal" has been completed as indicated by "completed" in FIG. 17, but execution of the "operation of gazing ahead of the vehicle" has not been completed, the notification control unit 1022B determines time B1, at which a time interval from time D at which the driving authority is transferred from the vehicle to the driver is TB1, as a time at which the driver is notified of the driving authority transfer and the above operation on the basis of the execution completion time (for example, fifteen seconds) corresponding to the content of the "operation of gazing ahead of the vehicle" execution of which has not been completed. The time interval TB is a period of time shorter than the time interval TA.

Similarly, when the information acquisition unit 101 acquires the schedule information from the vehicle control device 2, in a case where execution of the "operation of gazing ahead of the vehicle" has been completed, but execution of the "operation of holding the steering with both hands" and the "operation of placing a foot on the accelerator pedal or the brake pedal" has not been completed, the notification control unit 1022B adds the execution completion time (for example, ten seconds) corresponding to the content of the "operation of holding the steering with both hands" execution of which has not been completed and the execution completion time (for example, five seconds) corresponding to the content of the "operation of placing a foot on the accelerator pedal or the brake pedal" execution of which has not been completed. The notification control unit 1022B determines time B1, at which a time interval from time D at which the driving authority is transferred from the vehicle to the driver is TB1, as a time at which the driver is notified of the driving authority transfer and the above operations on the basis of the addition value (for example, fifteen seconds) of the execution completion times of the operations, execution of which has not been completed. As a result, the driver can execute the operation of which the driver has been notified with sufficient time.

In FIG. 16, since the processes in step ST4c to step ST13c are the same as the processes in step ST3 to step ST12 illustrated in FIG. 3, description thereof is omitted.

Note that functions of the information acquisition unit 101 and the notification unit 102C included in the notification device 10C are implemented by a processing circuit. That is, the notification device 10C includes a processing circuit for executing processes in step ST1b to step ST13b illustrated in FIG. 16. The processing circuit may be the dedicated hardware processing circuit 1002 illustrated in FIG. 7, or may be the processor 1003 for executing a program stored in the memory 1004 illustrated in FIG. 8.

As described above, in the notification device 10C according to the fourth embodiment, the notification unit 102C changes a notification timing of transferring driving authority from the vehicle to the driver and a notification timing of an operation requested to be executed by the driver, in accordance with the content of an operation, execution of which has not been completed by the driver. For example, in a case where the estimated time until the driver completes execution of an operation is long, the notification timing is advanced. As a result, since the driver can execute the operation of which the driver has been notified with sufficient time, the notification device 10C can cause the driver to reliably execute the operation of which the driver has been notified.

In the first to fourth embodiments, description has been given by assuming that the mobile object is a vehicle. However, the mobile object may be any mobile object capable of automatic driving and transferring driving authority from the mobile object to a driver. For example, the mobile object may be a railway, a ship, or an aircraft.

Note that the embodiments can be freely combined to each other, any component in each of the embodiments can be modified, or any component in each of the embodiments can be omitted.

INDUSTRIAL APPLICABILITY

The notification device according to the present disclosure has, for example, an automatic driving function and can be used for a vehicle in which switching from automatic driving to manual driving is performed.

REFERENCE SIGNS LIST

1: vehicle control system, 2: vehicle control device, 3: sensor group, 3a: accelerator sensor, 3b: brake sensor, 3c: steering sensor, 3d: in-vehicle camera, 3e: seat belt sensor, 3f: seating sensor, 3g: in-vehicle light sensor, 3h: GPS device, 3i: navigation system, 3j: out-of-vehicle camera, 3k: object detection sensor, 4: engine, 5: transmission, 6: brake actuator, 7: steering actuator, 8: blinker, 9: headlight, 10, 10A, 10B, 10C: notification device, 11: operation database, 12: display device, 12A: notification screen, 13: voice output device, 14: check mark image, 14a, 14b, 14c: image information, 101: information acquisition unit, 102, 102A, 102B, 102C: notification unit, 1000: input interface, 1001: output interface, 1002: processing circuit, 1003: processor, 1004: memory, 1021: determination unit, 1022, 1022A, 1022B, 1022C: notification control unit

The invention claimed is:

1. A notification device comprising:
processing circuitry configured to
acquire operation information indicating an operation status by a driver of a mobile object from a time point going back to the past with reference to a time point when schedule information indicating that driving authority is scheduled to be transferred from the mobile object to the driver is acquired, to a latest time point; and
notify the driver of an operation requested to be executed by the driver during a period from notification of the information indicating that the driving authority is transferred from the mobile object to the driver to transfer of the driving authority to the driver;
notify the driver of an operation, execution of which has not been completed by the driver before the driver is notified of the information indicating that the driving authority is transferred from the mobile object to the driver, among operations requested to be executed by the driver before the driving authority is transferred to the driver on a basis of the operation information, not notify the driver of an operation, execution of which has been completed by the driver before the driver is notified of the information indicating that the driving authority is transferred from the mobile object to the driver, notify the driver of an operation that does not satisfy an execution completion condition among operations, execution of which has been completed by the driver before the driver is notified of the information indicating that the driving authority is transferred from the mobile object to the driver in a case where there is time to spare before the driving authority is transferred from the mobile object to the driver, request the mobile object to stop moving in a case where there is an amount of time below a predetermined threshold before the driving authority is transferred from the mobile object to the driver, and control the mobile device to stop, and add an execution completion time expected for different operations, execution of which has not been completed by the driver, to a time when the schedule information regarding the transfer of the driving authority to the driver is acquired, the transfer being determined by the mobile object moving by automatic driving;

change a time going back to the past from a driving transfer time when the driving authority is transferred from the mobile object to the driver by a time interval obtained by adding the execution completion time, to a notification time when the driver is notified of the information indicating that the driving authority is transferred from the mobile object to the driver and the operation requested to be executed by the driver.

2. The notification device according to claim 1, wherein the operations requested to be executed by the driver include an operation of designating a state of an occupant of the mobile object.

3. The notification device according to claim 1, wherein the processing circuitry does not notify the driver of an operation, execution of which has been completed by the driver.

4. The notification device according to claim 1, wherein the processing circuitry requests the mobile object to transfer driving authority to the driver when execution of all notified operations has been completed.

5. The notification device according to claim 1, wherein the processing circuitry separately notifies the driver of an operation, execution of which has not been completed by the driver and an operation, execution of which has been completed by the driver.

6. A notification method comprising:

acquiring operation information indicating an operation status by a driver of a mobile object from a time point going back to the past with reference to a time point when schedule information indicating that driving authority is scheduled to be transferred from the mobile object to the driver is acquired, to a latest time point;

notifying the driver of an operation requested to be executed by the driver during a period from notification of the information indicating that the driving authority is transferred from the mobile object to the driver to transfer of the driving authority to the driver; and notifying the driver of an operation, execution of which has not been completed by the driver before the driver is notified of the information indicating that the driving authority is transferred from the mobile object to the driver, among operations requested to be executed by the driver before the driving authority is transferred to the driver on a basis of the operation information, not notifying the driver of an operation, execution of which has been completed by the driver before the driver is notified of the information indicating that the driving authority is transferred from the mobile object to the driver, notifying the driver of an operation that does not satisfy an execution completion condition among operations, execution of which has been completed by the driver before the driver is notified of the information indicating that the driving authority is transferred from the mobile object to the driver in a case where there is time to spare before the driving authority is transferred from the mobile object to the driver, requesting the mobile object to stop moving in a case where there is an amount of time below a predetermined threshold before the driving authority is transferred from the mobile object to the driver, and controlling the mobile device to stop;

adding an execution completion time expected for different operations, execution of which has not been completed by the driver, to a time when the schedule information regarding the transfer of the driving authority to the driver is acquired, the transfer being determined by the mobile object moving by automatic driving;

changing a time going back to the past from a driving transfer time when the driving authority is transferred from the mobile object to the driver by a time interval obtained by adding the execution completion time, to a notification time when the driver is notified of the information indicating that the driving authority is transferred from the mobile object to the driver and the operation requested to be executed by the driver.

7. The notification device according to claim 1, wherein the processing circuitry separately notifies the driver of an operation, execution of which has not been completed by the driver.

8. A non-transitory computer-readable medium storing executable instructions, which when executed by circuitry, cause the circuitry to perform a method, the method comprising:

acquiring operation information indicating an operation status by a driver of a mobile object from a time point going back to the past with reference to a time point when schedule information indicating that driving authority is scheduled to be transferred from the mobile object to the driver is acquired, to a latest time point;

notifying the driver of an operation requested to be executed by the driver during a period from notification of the information indicating that the driving authority is transferred from the mobile object to the driver to transfer of the driving authority to the driver; and notifying the driver of an operation, execution of which has not been completed by the driver before the driver is notified of the information indicating that the driving authority is transferred from the mobile object to the driver, among operations requested to be executed by the driver before the driving authority is transferred to the driver on a basis of the operation information, not notifying the driver of an operation, execution of which has been completed by the driver before the driver is notified of the information indicating that the driving authority is transferred from the mobile object to the driver, notifying the driver of an operation that does not satisfy an execution completion condition among operations, execution of which has been completed by the driver before the driver is notified of the information indicating that the driving authority is transferred from the mobile object to the driver in a case where there is time to spare before the driving authority is transferred from the mobile object to the driver, requesting the mobile object to stop moving in a case where there is an amount of time below a predetermined threshold before the driving authority is transferred from the mobile object to the driver, and controlling the mobile device to stop;

adding an execution completion time expected for different operations, execution of which has not been completed by the driver, to a time when the schedule information regarding the transfer of the driving authority to the driver is acquired, the transfer being determined by the mobile object moving by automatic driving;

changing a time going back to the past from a driving transfer time when the driving authority is transferred from the mobile object to the driver by a time interval obtained by adding the execution completion time, to a notification time when the driver is notified of the information indicating that the driving authority is transferred from the mobile object to the driver and the operation requested to be executed by the driver; and outputting to a display device or a voice output device of the mobile object at the changed time, a driving authority transfer notification for notifying the information indicating that the driving authority is transferred and the operation, execution of which has not been completed by the driver.

* * * * *